US012657813B2

(12) United States Patent     (10) Patent No.:   US 12,657,813 B2

Mory et al.     (45) Date of Patent:   Jun. 16, 2026

(54) VOLUMETRIC LIGHTING OF 3D OVERLAYS ON 2D IMAGES

(71) Applicant: KONINKLIJKE PHILIPS N.V., Eindhoven (NL)

(72) Inventors: Benoit Jean-Dominique Bertrand Maurice Mory, Medford, MA (US); Emmanuel Mocé Serge Attia, Paris (FR); Jean Michel Rouet, Paris (FR); Cybele Ciofolo-Veit, Meudon (FR); Antoine Olivier, Suresnes (FR); Vipul Shrihari Pai Raikar, Somerville, MA (US); Kunal Vaidya, Boston, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 457 days.

(21) Appl. No.: 17/800,012

(22) PCT Filed: Feb. 12, 2021

(86) PCT No.: PCT/EP2021/053563

§ 371 (c)(1),
(2) Date: Aug. 16, 2022

(87) PCT Pub. No.: WO2021/165165

PCT Pub. Date: Aug. 26, 2021

(65) Prior Publication Data

US 2023/0070102 A1     Mar. 9, 2023

Related U.S. Application Data

(60) Provisional application No. 63/042,801, filed on Jun. 23, 2020.

(30) Foreign Application Priority Data

Feb. 18, 2020    (EP) .................................... 20290016

(51) Int. Cl.
    *G06T 15/50*     (2011.01)
    *G06T 17/00*     (2006.01)
    *G06T 19/20*     (2011.01)

(52) U.S. Cl.
    CPC .......... *G06T 15/506* (2013.01); *G06T 15/503* (2013.01); *G06T 17/00* (2013.01);
       (Continued)

(58) Field of Classification Search
    CPC ..... G06T 15/506; G06T 15/503; G06T 17/00; G06T 19/20; G06T 2210/62;
       (Continued)

(56) References Cited

U.S. PATENT DOCUMENTS 6,437,782 B1 *   8/2002   Pieragostini ............ G06T 15/60
                                    345/589
6,443,896 B1   9/2002   Detmer
           (Continued)

FOREIGN PATENT DOCUMENTS

JP       2015016062 A    1/2015
WO     2019197203 A1   10/2019

OTHER PUBLICATIONS

International Search Report and Written Opinion for PCT/EP2021/053563; Mailed May 31, 2021, 10 pages.

*Primary Examiner* — Xiao M Wu

(57) ABSTRACT

In some examples, one or more three dimensional (3D) objects may be rendered in relation to a two dimensional (2D) imaging slice. The 3D object may be rendered such that the 3D object casts a colored shadow on the 2D imaging slice. In some examples, the 3D object may be rendered in colors where different colors indicate a distance from the portion of the 3D object from the 2D imaging slice.

21 Claims, 16 Drawing Sheets

(52) U.S. Cl.
  CPC .......... G06T 19/20 (2013.01); *G06T 2210/62*
                (2013.01); *G06T 2219/2004* (2013.01)
(58) Field of Classification Search
  CPC ......... G06T 2219/2004; G06T 2210/41; G06T
                                              2219/2012
  See application file for complete search history.

(56)                    References Cited

U.S. PATENT DOCUMENTS

|  |  |  |  |
|---|---|---|---|
| 6,480,732 | B1 | 11/2002 | Tanaka et al. |
| 6,530,885 | B1 | 3/2003 | Entrekin et al. |
| 9,659,405 | B2 | 5/2017 | Wahrenberg |
| 10,896,538 | B2 | 1/2021 | Mory et al. |
| 2010/0240997 | A1 | 9/2010 | Ichioka et al. |
| 2011/0137156 | A1 | 6/2011 | Razzaque et al. |
| 2016/0249879 | A1* | 9/2016 | Mauldin, Jr. ........ A61B 8/5223 |
|  |  |  | 600/437 |
| 2016/0292913 | A1 | 10/2016 | Wahrenberg |
| 2019/0014764 | A1 | 1/2019 | Kim |
| 2020/0005361 | A1* | 1/2020 | Zeiger ................... G06T 15/503 |
| 2020/0054398 | A1* | 2/2020 | Kovtun ................. G16H 40/63 |

* cited by examiner

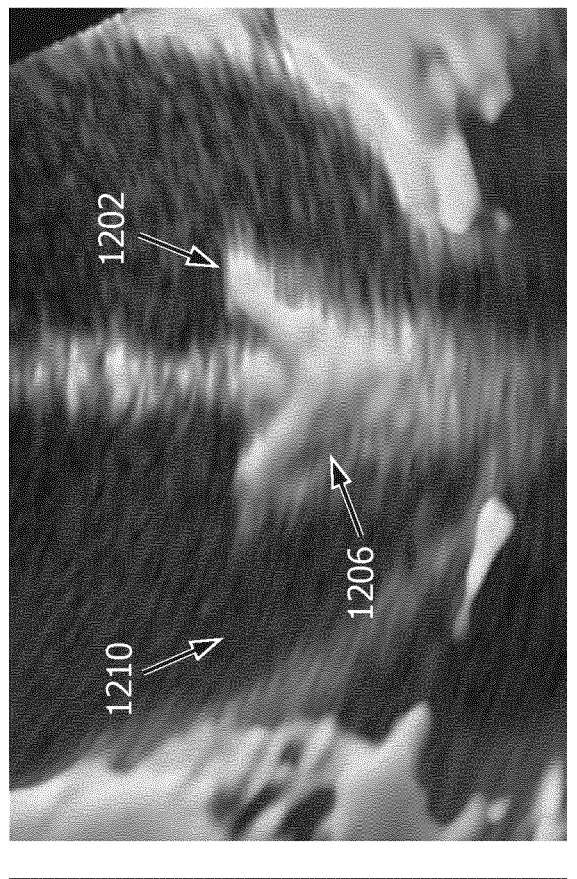
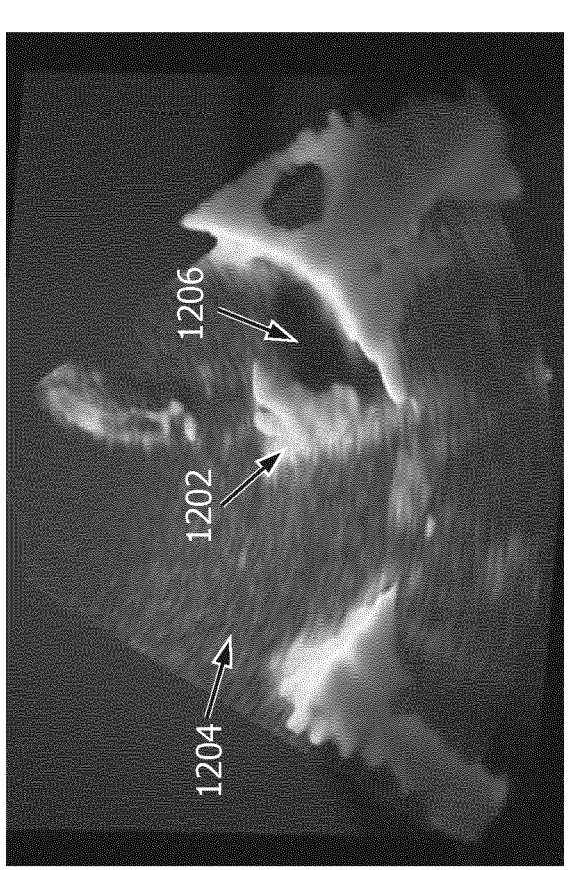
FIG. 12A
FIG. 12B

VOLUMETRIC LIGHTING OF 3D OVERLAYS ON 2D IMAGES

CROSS-REFERENCE TO PRIOR APPLICATIONS

This application is the U.S. National Phase application under 35 U.S.C. § 371 of International Application No. PCT/EP2021/053563, filed on Feb. 12, 2021, which claims the benefit of U.S. Provisional Patent Application No. 63/042,801, filed Jun. 23, 2020, and European Patent Application No. 20290016.3, filed on Feb. 18, 2020. These applications are hereby incorporated by reference herein.

TECHNICAL FIELD

This application relates to rendering of three dimensional overlays in medical imaging. More specifically, this application relates to volumetric lighting of renderings of three dimensional overlays in relation to two dimensional image planes.

BACKGROUND

By training and experience, radiologists, surgeons, and other clinicians often feel more confident working with two dimensional (2D) images, even when a three dimensional (3D) imaging source is available. With 3D ultrasound for instance, multiple reformatted slices are typically extracted from a 3D dataset (e.g., volume) at various orientations and displayed as 2D images for a better confidence in diagnostics, intervention planning or real-time navigation. With increasingly available segmentation tools, 3D models can also be created and displayed as virtual representations of specific structures, anatomical models, or interventional devices. Visualization of these 3D objects in conjunction with the primary 2D imaging sources is often desired.

SUMMARY

As disclosed herein, three dimensional (3D) objects are overlaid on a two dimensional (2D) frame by using volumetric lighting and assigning translucent materials to the 3D objects so that they cast colored shadows on gray-valued image textures. Optionally, the 3D objects may be colorized based on a distance from the view and/or from the 2D plane.

In some examples, the technique may include rendering a 3D scene composed of multiple elements: a 2D image of known position and orientation in 3D space, from a 2D imaging source or from a 3D volume sliced in arbitrary orientation; one or more objects from a volume, 3D graphics, and/or a surface mesh. At least one light source may cast volumetric shadows from the object(s) at an oblique angle. The 3D scene may be rendered with photo-realistic material definitions, including light absorption properties.

In accordance with at least one example disclosed herein, an apparatus may include a processor configured to assign material properties to voxels of an image slice obtained from a first volume, assign material properties to voxels of a three dimensional (3D) object obtained from a second volume, and render a 3D scene including the image slice and the 3D object, wherein the material properties assigned to the voxels of the 3D object are configured to cause the 3D object to be rendered semi-transparent in the 3D scene, and to alter a color of light from at least one virtual light source as the light from the at least one virtual light source propagates through the 3D object when rendering the 3D scene. The apparatus may include a display configured to display the 3D scene.

In accordance with at least one example disclosed herein, a method may include assigning material properties to voxels of an image slice obtained from a first volume, assigning material properties to voxels of a three dimensional (3D) object obtained from a second volume, and rendering a 3D scene including the image slice and the 3D object, wherein the material properties assigned to the voxels of the 3D object are configured to cause the 3D object to alter a color of light from at least one virtual light source as the light propagates through the 3D object.

In accordance with at least one example disclosed herein, a non-transitory computer readable medium including instructions, that when executed, may cause an ultrasound imaging system to assign material properties to voxels of an image slice obtained from a first volume, assign material properties to voxels of a three dimensional (3D) object obtained from a second volume, and render a 3D scene including the image slice and the 3D object, wherein the material properties assigned to the voxels of the 3D object are configured to cause the 3D object to alter a color of light from at least one virtual light source as the light propagates through the 3D object.

BRIEF DESCRIPTION OF THE DRAWINGS

FIG. 12A and FIG. 12B show 3D scenes of a mitral valve clip in a 2D plane of a cardiac view acquired by ultrasound imaging in accordance with examples of the present disclosure.

DESCRIPTION

The following description of certain exemplary examples is merely exemplary in nature and is in no way intended to limit the disclosure or its applications or uses. In the following detailed description of examples of the present systems and methods, reference is made to the accompanying drawings which form a part hereof, and in which are shown by way of illustration specific examples in which the described apparatuses, systems and methods may be practiced. These examples are described in sufficient detail to enable those skilled in the art to practice the presently disclosed apparatuses, systems and methods, and it is to be understood that other examples may be utilized and that structural and logical changes may be made without departing from the spirit and scope of the present disclosure. Moreover, for the purpose of clarity, detailed descriptions of certain features will not be discussed when they would be apparent to those with skill in the art so as not to obscure the description of the present disclosure. The following detailed description is therefore not to be taken in a limiting sense, and the scope of the present apparatuses, systems and methods is defined only by the appended claims.

Despite advances in three dimensional (3D) imaging and rendering techniques, users of medical imaging systems, such as radiologists, surgeons, and sonographers, often still feel more comfortable making decisions based on two dimensional (2D) images. Thus, even if a volume is scanned within a subject, 2D images (e.g., frames) are typically extracted from the volume, for example, by a multiplanar reformatter, for display to the user rather than a rendering of the full scanned volume or renderings of selected 3D objects (e.g., organs, implants) within the scanned volume. However, in some applications, users want or need to view 3D objects in relation to a 2D plane. For example, a surgeon may want to view a 3D rendering of a mitral valve clip in relation to a 2D image of the heart. However, even when 3D objects are extracted from the same data set as the 2D image, the 2D images and 3D objects may not be easy for the user to reconcile and visualize together in a 3D scene.

Many visualization toolkits (e.g. VTK, OpenGL) support fusion of surface-rendered meshes with 2D textures mapped onto 3D planes. This type of 3D "overlay" can be difficult to interpret and often requires manipulation to oblique view angles to understand spatial relations and distances. When the view plane is parallel to the image, which is the preferred angle for image display without geometric distortion, depth perception is especially limited.

Figure 1:
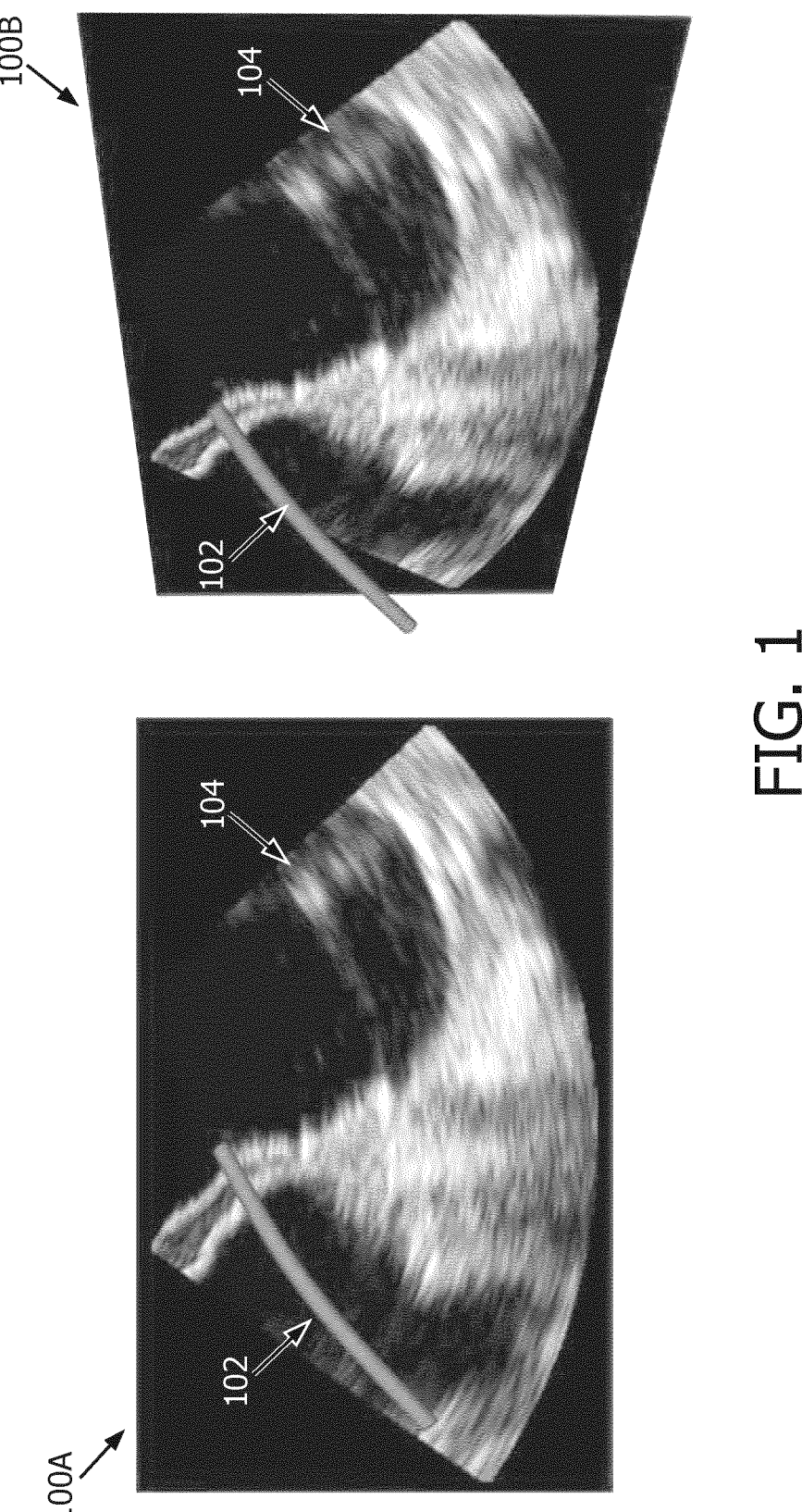
FIG. 1 shows an example image of an overlay of a three dimensional object on a two dimensional image.

This problem is illustrated in FIG. 1, which shows an example image of an overlay of a three dimensional object on a two dimensional slice. In the image, a virtual transseptal puncture needle 102 has been extracted from a 3D ultrasound acquisition. Represented as a 3D mesh model, the needle 102 is rendered simultaneously with a 2D planar image 104 generated from a slice from the same acquisition. Rendering is performed with surface and texture shaders of a standard 3D visualization software, VTK in this example. In the left view 100A, the view plane is parallel to image 104 and it is difficult to visually appreciate the distance of the needle 102 to the plane of the image 104. Rotating the view to an oblique angle, as shown in the right view 100B, offers a slightly better perspective but introduces a geometric distortion to the image 104 and still does not adequately convey the distance between the tip of the needle 102 and the image 104.

In some applications, for fusion of 2D and 3D information, virtual/mixed reality headsets and stereoscopic/holographic displays may help with depth perception but require dedicated hardware and are not widely available. Accordingly, improved rendering of 3D scenes with both 2D and 3D information (e.g., 2D images and 3D objects) is desired.

Photo-realistic rendering applies physically-based ray-tracing to generate a 2D view of a 3D scene composed of multiple 3D objects. Compared to surface shading used in most 3D visualization software packages, physically-based rendering may improve depth perception through more realistic lighting effects. These advanced algorithms may improve visualization of the spatial position of 3D virtual objects in relation to 2D images, especially the ability to cast shadows. According to examples of the present disclosure, 2D images may be fused with one or more 3D objects using volumetric lighting and assigning translucent materials to the one or more 3D objects so that they cast colored shadows on gray-valued (e.g., grayscale) image textures of the 2D image. Optionally, the 3D objects may be colorized based, at least in part, on how far the 3D objects are from the 2D image.

Figure 2B:
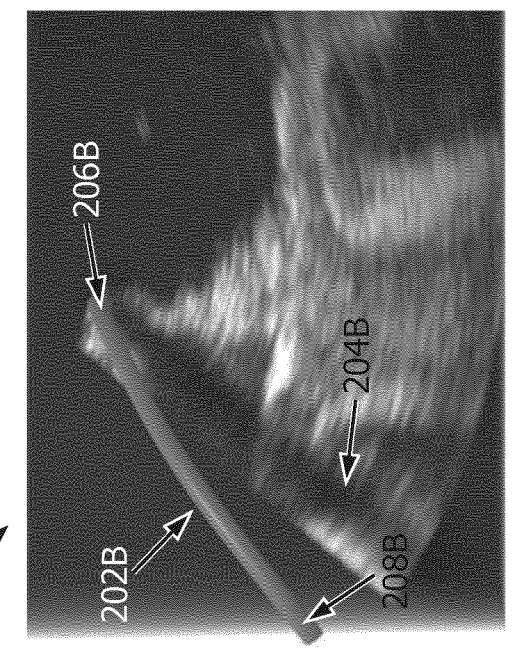
FIG. 2A and FIG. 2B show example images of overlays of a three dimensional object on a two dimensional image in accordance with examples of the present disclosure.
Figure 2A:
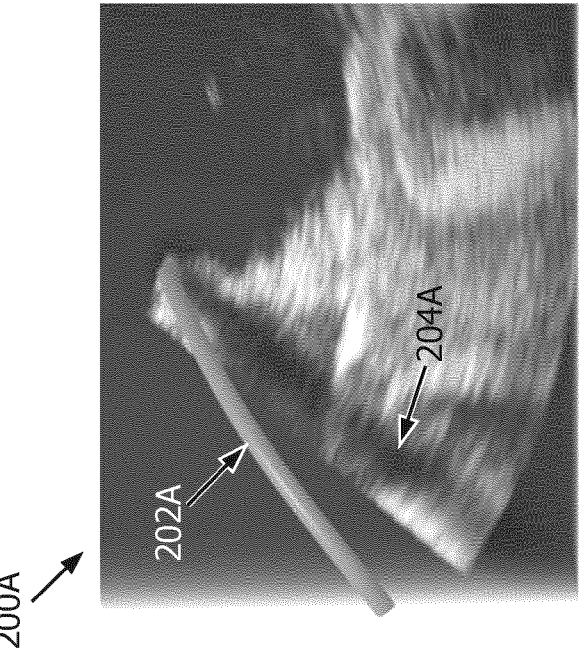

FIGS. 2A and 2B show example images of overlays of a three dimensional object on a two dimensional image in accordance with examples of the present disclosure. As illustrated in FIG. 2A, shadows 204A of a 3D object 202A on a grayscale 2D image 200A provide a depth cue when the view is parallel to the image. Physically-based calculations of light absorption and/or scattering may create soft shadows of recognizable colors (e.g., blue, orange, green, red). Projecting colored shadows instead of grayscale shadows onto the 2D image 200A may prevent the shadows 204A from being confused with darker regions of the 2D image 200A and/or more easily interpreted by a viewer. As illustrated in FIG. 2B, in addition to shadows 204B of a 3D object 202B provided on a grayscale 2D image 200B, 3D object 202B has a gradient shading to provide an additional depth cue. The 3D object 202B is a color at a location 206B close to the 2D image 200B and gradually changes to a different color at a location 208B farther from the 2D image 200B. While the example shown in FIG. 2B provides a gradient between two different colors as a function of how far the portion of the 3D object 202B is from the 2D image 200B, a gradient with multiple colors (e.g., three, four) could also be used.

Figure 3:
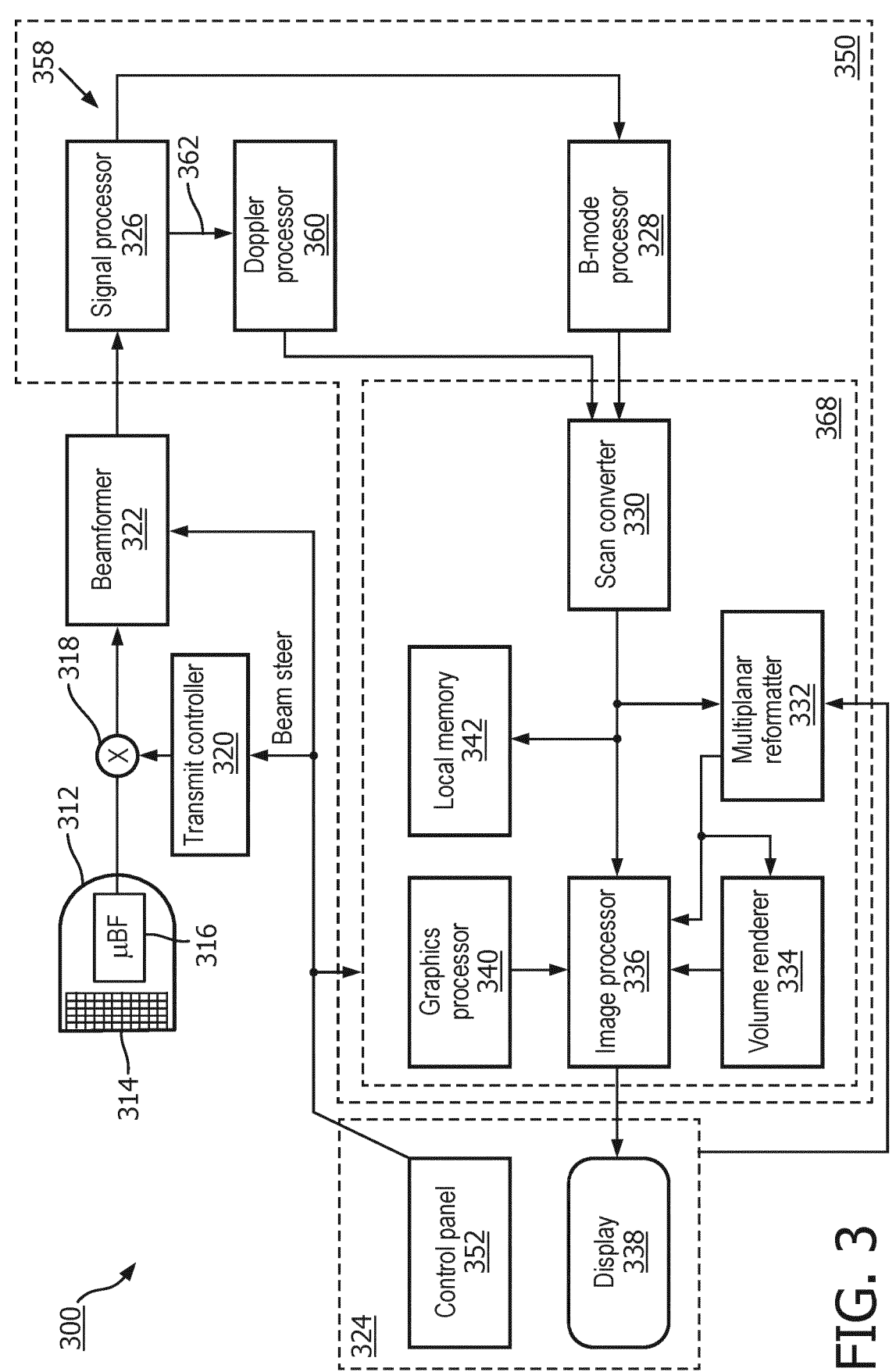
FIG. 3 is a block diagram of an ultrasound imaging system arranged in accordance with examples of the present disclosure.

FIG. 3 shows a block diagram of an ultrasound imaging system 300 constructed in accordance with examples of the present disclosure. An ultrasound imaging system 300 according to the present disclosure may include a transducer array 314, which may be included in an ultrasound probe 312, for example an external probe or an internal probe such as an intravascular ultrasound (IVUS) catheter probe. In other examples, the transducer array 314 may be in the form of a flexible array configured to be conformally applied to a surface of subject to be imaged (e.g., patient). The transducer array 314 is configured to transmit ultrasound signals (e.g., beams, waves) and receive echoes (e.g., received ultrasound signals) responsive to the transmitted ultrasound signals. A variety of transducer arrays may be used, e.g., linear arrays, curved arrays, or phased arrays. The transducer array 314, for example, can include a two dimensional array (as shown) of transducer elements capable of scanning in both elevation and azimuth dimensions for 2D and/or 3D imaging. As is generally known, the axial direction is the direction normal to the face of the array (in the case of a curved array the axial directions fan out), the azimuthal direction is defined generally by the longitudinal dimension of the array, and the elevation direction is transverse to the azimuthal direction.

In some examples, the transducer array 314 may be coupled to a microbeamformer 316, which may be located in the ultrasound probe 312, and which may control the transmission and reception of signals by the transducer elements in the array 314. In some examples, the microbeamformer 316 may control the transmission and reception of signals by active elements in the array 314 (e.g., an active subset of elements of the array that define the active aperture at any given time).

In some examples, the microbeamformer 316 may be coupled, e.g., by a probe cable or wirelessly, to a transmit/ receive (T/R) switch 318, which switches between transmission and reception and protects the main beamformer 322 from high energy transmit signals. In some examples, for example in portable ultrasound systems, the T/R switch 318 and other elements in the system can be included in the ultrasound probe 312 rather than in the ultrasound system base, which may house the image processing electronics. An ultrasound system base typically includes software and hardware components including circuitry for signal processing and image data generation as well as executable instructions for providing a user interface.

The transmission of ultrasonic signals from the transducer array 314 under control of the microbeamformer 316 is directed by the transmit controller 320, which may be coupled to the T/R switch 318 and a main beamformer 322. The transmit controller 320 may control the direction in which beams are steered. Beams may be steered straight ahead from (orthogonal to) the transducer array 314, or at different angles for a wider field of view. The transmit controller 320 may also be coupled to a user interface 324 and receive input from the user's operation of a user input device (e.g., user control). The user interface 324 may include one or more input devices such as a control panel 352, which may include one or more mechanical controls (e.g., buttons, sliders, etc.), touch sensitive controls (e.g., a trackpad, a touchscreen, or the like), and/or other known input devices.

In some examples, the partially beamformed signals produced by the microbeamformer 316 may be coupled to a main beamformer 322 where partially beamformed signals from individual patches of transducer elements may be combined into a fully beamformed signal. In some examples, microbeamformer 316 is omitted. In these examples, the transducer array 314 is under the control of the main beamformer 322, and the main beamformer 322 performs all beamforming of signals. In examples with and without the microbeamformer 316, the beamformed signals of the main beamformer 322 are coupled to processing circuitry 350, which may include one or more processors (e.g., a signal processor 326, a B-mode processor 328, a Doppler processor 360, and one or more image generation and processing components 368) configured to produce an ultrasound image from the beamformed signals (i.e., beamformed RF data).

The signal processor 326 may be configured to process the received beamformed RF data in various ways, such as bandpass filtering, decimation, I and Q component separation, and harmonic signal separation. The signal processor 326 may also perform additional signal enhancement such as speckle reduction, signal compounding, and electronic noise elimination. The processed signals (also referred to as I and Q components or IQ signals) may be coupled to additional downstream signal processing circuits for image generation. The IQ signals may be coupled to a plurality of signal paths within the system, each of which may be associated with a specific arrangement of signal processing components suitable for generating different types of image data (e.g., B-mode image data, Doppler image data). For example, the system may include a B-mode signal path 358 which couples the signals from the signal processor 326 to a B-mode processor 328 for producing B-mode image data.

The B-mode processor 328 can employ amplitude detection for the imaging of structures in the body. The B-mode processor 328 may generate signals for tissue images and/or contrast images. The signals produced by the B-mode processor 328 may be coupled to a scan converter 330 and/or a multiplanar reformatter 332. The scan converter 330 may be configured to arrange the echo signals from the spatial relationship in which they were received to a desired image format. For instance, the scan converter 330 may arrange the echo signal into a two dimensional (2D) sector-shaped format, or a pyramidal or otherwise shaped three dimensional (3D) format.

In some examples, the system may include a Doppler signal path 362 which couples the output from the signal processor 126 to a Doppler processor 360. The Doppler processor 360 may be configured to estimate the Doppler shift and generate Doppler image data. The Doppler image data may include color data which is then overlaid with B-mode (i.e. grayscale) image data for display. The Doppler processor 360 may be configured to filter out unwanted signals (i.e., noise or clutter associated with non-moving tissue), for example using a wall filter. The Doppler processor 360 may be further configured to estimate velocity and power in accordance with known techniques. For example, the Doppler processor may include a Doppler estimator such as an auto-correlator, in which velocity (Doppler frequency) estimation is based on the argument of the lag-one autocorrelation function (e.g., R1) and Doppler power estimation is based on the magnitude of the lag-zero autocorrelation function (e.g., R0). The velocity estimations may be referred to as color Doppler data and the power estimations may be referred to as power Doppler data. Motion can also be estimated by known phase-domain (for example, parametric frequency estimators such as MUSIC, ESPRIT, etc.) or time-domain (for example, cross-correlation) signal processing techniques. Other estimators related to the temporal or spatial distributions of velocity such as estimators of acceleration or temporal and/or spatial velocity derivatives can be used instead of or in addition to velocity estimators. In some examples, the velocity and power estimates (e.g., the color and power Doppler data) may undergo further threshold detection to further reduce noise, as well as segmentation and post-processing such as filling and smoothing. The velocity and/or power estimates may then be mapped to a desired range of display colors and/or intensities in accordance with one or more color and/or intensity maps. The map data, also referred to as Doppler image data, may then be coupled to the scan converter 130, where the Doppler image data may be converted to the desired image format to form a color Doppler or a power Doppler image.

The multiplanar reformatter 332 can convert echoes which are received from points in a common plane (e.g., slice) in a volumetric region of the body into an ultrasonic image (e.g., a B-mode image) of that plane, for example as described in U.S. Pat. No. 6,443,896 (Detmer). In some examples, the user interface 324 may be coupled to the multiplanar reformatter 332 for selection and control of a display of multiple multiplanar reformatted (MPR) images. In other words, a user may select a desired plane within the volume from which to generate a 2D image. In some examples, in addition to selecting a location and/or orientation of the plane in the volume, the user may also select a thickness of the plane. In some examples, the plane data of the multiplanar reformatter 332 may be provided to a volume renderer 334. The volume renderer 334 may generate (also referred to as render) an image (also referred to as a projection, rendering, or 3D scene) of the 3D dataset as viewed from a given reference point, for example as described in U.S. Pat. No. 6,530,885 (Entrekin et al.). While the 3D dataset may include voxels and the image of the 3D dataset is generated based on the voxels, in some examples, the image rendered from the 3D dataset may be a 2D image that includes pixels that can be displayed on a traditional 2D display (e.g., liquid crystal display, plasma screen).

According to examples of the present disclosure, the volume renderer 334 may render a 3D scene that includes one or more 3D objects in relation to a 2D image. The position and orientation of the plane from which the 2D image was generated with relation to a volume (e.g., 3D space) may be known, collectively referred to as location information. In some examples, the plane, 2D image and/or the location information of the plane may be provided to the volume renderer 334 by the multiplanar reformatter 332. The position and orientation of the one or more 3D objects in the volume may also be known. In some examples, the 3D objects may be extracted from the same image acquisition from which the 2D image was generated. In some examples, the 3D objects are from a separate acquisition and/or volume dataset that is registered to the volume from which the 2D image was generated.

The volume renderer 334 may assign material properties to the plane and the 3D objects (e.g., color, absorption, opacity, reflectivity). In some examples, the material properties may be uniform across the plane and/or 3D objects. In some examples, the material properties may vary across voxels of the plane and/or 3D objects. Optionally, some material properties of the 3D objects may be assigned based, at least in part, on a location of a voxel relative to the plane or a viewer of the 3D scene. For example, a color assigned to a voxel of a 3D object may change depending on the voxel's distance from the plane.

The volume renderer 334 may simulate lighting of the 3D scene by a virtual light source. In some examples, a position of the light source relative to the 3D objects and the plane may be adjusted and/or selected by a user via the user interface 324 (e.g., entering a distance value on a keyboard, dragging a light icon on a display closer or farther from a previously rendered 3D scene or icons representing the 2D image and/or 3D objects). How the light propagates from the light source through the 3D scene may be based, at least in part, to the material properties assigned to the voxels. For example, the intensity and color of shadows cast by 3D objects may be based on material properties assigned to the 3D objects. The volume renderer 334 may render the 3D objects and 2D image of the 3D scene based, at least in part, on the material properties and the lighting provided by the virtual light source.

Output from the scan converter 330 (e.g., B-mode images, Doppler images), the multiplanar reformatter 332, and/or the volume renderer 334 (e.g., volumes, 3D scenes) may be coupled to an image processor 336 for further enhancement, buffering and temporary storage before being displayed on an image display 338. In some examples, a Doppler image may be overlaid on a B-mode image of the tissue structure by the scan converter 330 and/or image processor 336 for display.

A graphics processor 340 may generate graphic overlays for display with the images. These graphic overlays may contain, for example, standard identifying information such as patient name, date and time of the image, imaging parameters, and the like. For these purposes the graphics processor 340 may be configured to receive input from the user interface 324, such as a typed patient name or other annotations The system 300 may include local memory 342. Local memory 342 may be implemented as any suitable non-transitory computer readable medium (e.g., flash drive, disk drive). Local memory 342 may store data generated by the system 300 including images, 3D models, executable instructions, inputs provided by a user via the user interface 324, or any other information necessary for the operation of the system 300.

As mentioned previously system 300 includes user interface 324. User interface 324 may include display 338 and control panel 352. The display 338 may include a display device implemented using a variety of known display technologies, such as LCD, LED, OLED, or plasma display technology. In some examples, display 338 may comprise multiple displays. The control panel 352 may be configured to receive user inputs (e.g., desired image plane, desired three dimensional object, etc.). The control panel 352 may include one or more hard controls (e.g., buttons, knobs, dials, encoders, mouse, trackball or others). In some examples, the control panel 352 may additionally or alternatively include soft controls (e.g., GUI control elements or simply, GUI controls) provided on a touch sensitive display. In some examples, display 338 may be a touch sensitive display that includes one or more soft controls of the control panel 352.

In some examples, various components shown in FIG. 3 may be combined. For instance, image processor 336 and graphics processor 340 may be implemented as a single processor. In another example, the Doppler processor 360 and B-mode processor 328 may be implemented as a single processor. In some examples, various components shown in FIG. 3 may be implemented as separate components. For example, signal processor 326 may be implemented as separate signal processors for each imaging mode (e.g., B-mode, Doppler). In some examples, one or more of the various processors shown in FIG. 3 may be implemented by general purpose processors and/or microprocessors configured to perform the specified tasks. In some examples, one or more of the various processors may be implemented as application specific circuits. In some examples, one or more of the various processors (e.g., image processor 336) may be implemented with one or more graphical processing units (GPU).

Figure 4:
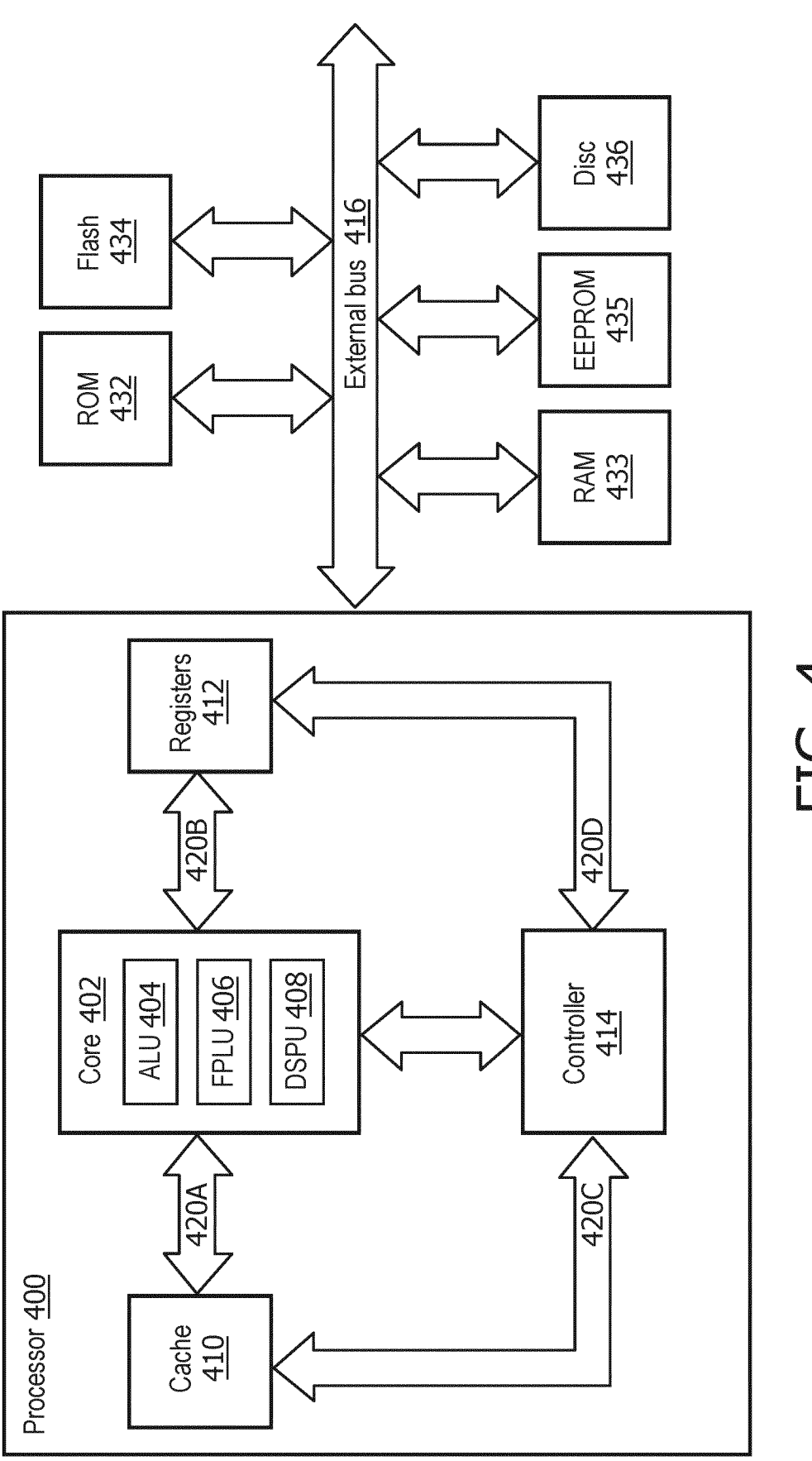
FIG. 4 is a block diagram illustrating an example processor in accordance with examples of the present disclosure.

FIG. 4 is a block diagram illustrating an example processor 400 in accordance with examples of the present disclosure. Processor 400 may be used to implement one or more processors described herein, for example, image processor 336 shown in FIG. 3. Processor 400 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof.

The processor 400 may include one or more cores 402. The core 402 may include one or more arithmetic logic units (ALU) 404. In some examples, the core 402 may include a floating point logic unit (FPLU) 406 and/or a digital signal processing unit (DSPU) 408 in addition to or instead of the ALU 404.

The processor 400 may include one or more registers 412 communicatively coupled to the core 402. The registers 412 may be implemented using dedicated logic gate circuits (e.g., flip-flops) and/or any memory technology. In some examples the registers 412 may be implemented using static memory. The register may provide data, instructions and addresses to the core 402.

In some examples, processor 400 may include one or more levels of cache memory 410 communicatively coupled to the core 402. The cache memory 410 may provide computer-readable instructions to the core 402 for execution. The cache memory 410 may provide data for processing by the core 402. In some examples, the computer-readable instructions may have been provided to the cache memory 410 by a local memory, for example, local memory attached to the external bus 416. The cache memory 410 may be implemented with any suitable cache memory type, for example, metal-oxide semiconductor (MOS) memory such as static random access memory (SRAM), dynamic random access memory (DRAM), and/or any other suitable memory technology.

The processor 400 may include a controller 414, which may control input to the processor 400 from other processors and/or components included in a system (e.g., control panel 352 and scan converter 330 shown in FIG. 3) and/or outputs from the processor 400 to other processors and/or components included in the system (e.g., display 338 and volume renderer 334 shown in FIG. 3). Controller 414 may control the data paths in the ALU 404, FPLU 406 and/or DSPU 408. Controller 414 may be implemented as one or more state machines, data paths and/or dedicated control logic. The gates of controller 414 may be implemented as standalone gates, FPGA, ASIC or any other suitable technology.

The registers 412 and the cache memory 410 may communicate with controller 414 and core 402 via internal connections 420A, 420B, 420C and 420D. Internal connections may implemented as a bus, multiplexor, crossbar switch, and/or any other suitable connection technology.

Inputs and outputs for the processor 400 may be provided via a bus 416, which may include one or more conductive lines. The bus 416 may be communicatively coupled to one or more components of processor 400, for example the controller 414, cache memory 410, and/or register 412. The bus 416 may be coupled to one or more components of the system, such as display 338 and control panel 352 mentioned previously.

The bus 416 may be coupled to one or more external memories. The external memories may include Read Only Memory (ROM) 432. ROM 432 may be a masked ROM, Electronically Programmable Read Only Memory (EPROM) or any other suitable technology. The external memory may include Random Access Memory (RAM) 433. RAM 433 may be a static RAM, battery backed up static RAM, Dynamic RAM (DRAM) or any other suitable technology. The external memory may include Electrically Erasable Programmable Read Only Memory (EEPROM) 435. The external memory may include Flash memory 434. The external memory may include a magnetic storage device such as disc 436. In some examples, the external memories may be included in a system, such as ultrasound imaging system 300 shown in FIG. 3, for example local memory 342.

Figure 5:
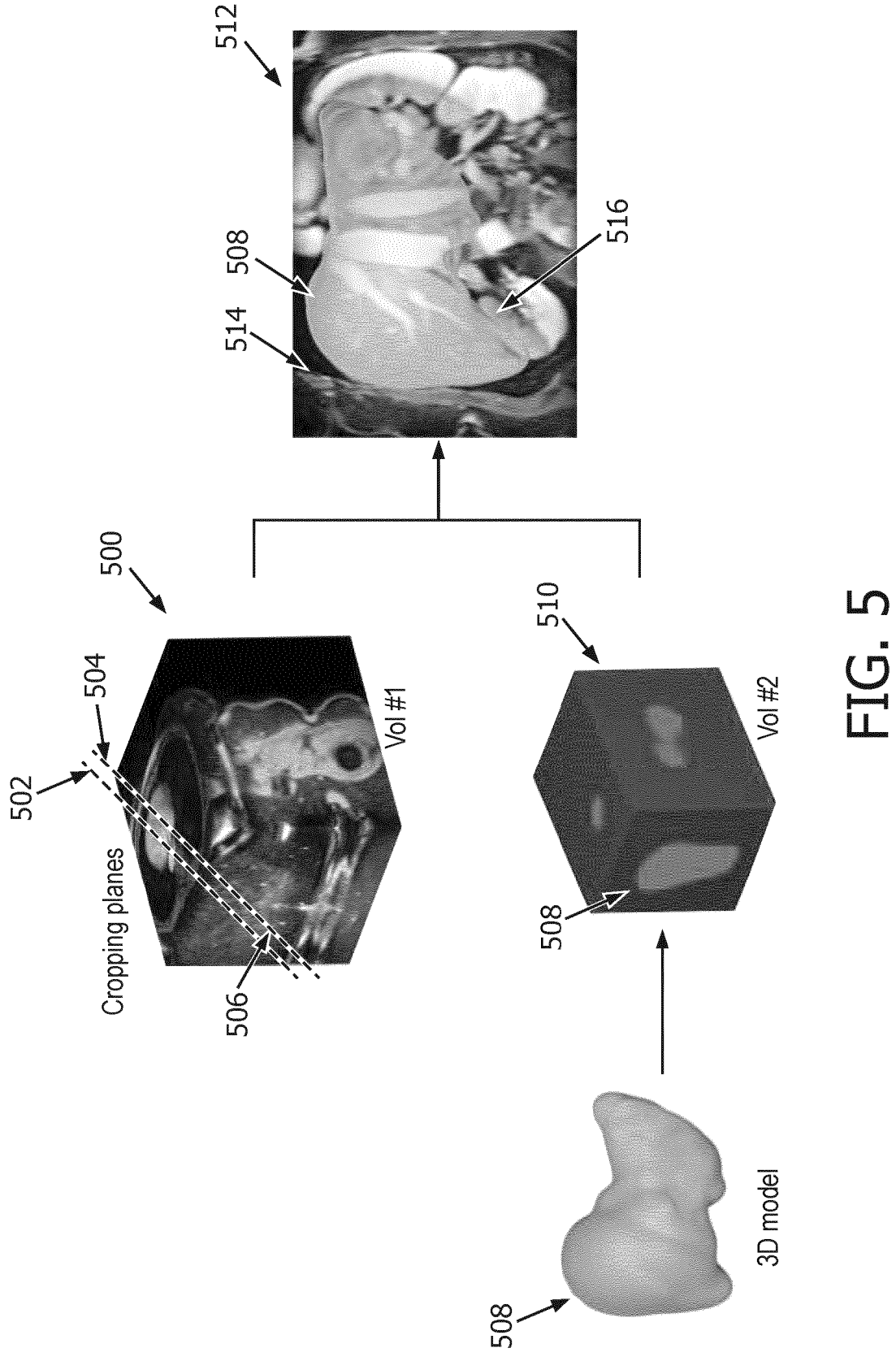
FIG. 5 provides a graphical overview of rendering a three dimensional scene in accordance with examples of the present disclosure.

FIG. 5 provides a graphical overview of rendering a 3D scene in accordance with examples of the present disclosure. A volume 500 may be acquired by an imaging system, such as imaging system 300 shown in FIG. 3. However, the volume may have been acquired by other imaging modalities such as computed tomography or magnetic resonance imaging. A slice 506 from which to generate a 2D image may be selected by positioning two parallel cropping planes 502, 504 within the volume 500. The position and/or orientation of the two cropping planes 502, 504 may be selected by a user via a user interface (e.g., user interface 324) in some examples. The distance between the two cropping planes 502, 504 may be adjustable in some examples. That is, the thickness of the slice 506 may be adjustable. In some examples, the selection and extraction of the slice 506 from the volume 500 may be performed, at least in part, with a multiplanar reformatter (e.g., multiplanar reformatter 332).

One or more 3D objects 508 may be extracted from another volume 510. In some examples, the volume 510 may be from the same imaging acquisition as volume as 500. In other examples, the volume 510 is from a different imaging acquisition or a simulated volume that is registered to the volume 500. For example, the volumes 500 and 510 may be registered to one another using anatomical landmarks common to both volumes. In some examples, the 3D objects 508 may be anatomical structures (e.g., blood vessel, liver) and/or invasive devices (e.g., catheter, mitral valve clip, stent) that may be segmented from the volume 510 by known image processing techniques. In some examples, the 3D objects may be models of anatomical structures and/or invasive devices. In some examples, an anatomical structure or device may be segmented from the volume 510 and a model may be overlaid on the anatomical structure or device and/or replace the anatomical structure or device in the volume 510. In some examples, the 3D object 508 may be generated by a volumetric rasterization of a 3D surface, for example a known algorithm may be used to transform a triangular mesh input to a signed distance function defined on a voxel grid. The volumetric rasterization may be generated for either an anatomical structure or a model. In some examples, the extracting/segmenting of 3D objects 508 and/or registering of volumes 500, 510 may be performed, at least in part, by a volume renderer (e.g., volume renderer 334).

The volume renderer may assign material properties to voxels of the volume 500. In some examples, the material properties may be defined to absorb light without affecting color of the light during propagation and reflect light as a function of the gray-value intensity of the voxels in the slice 506. The material properties of the slice 506 may be assigned to control transparency of the slice 506 (e.g., opaque, semi-transparent). In some examples, all voxels in the volume 500 not included in the slice 506 may be assigned material properties such that they are transparent. The volume renderer may assign material properties to voxels of the volume 510. In some examples, the material properties of voxels included in 3D objects 508 may be defined to allow light to deeply penetrate inside and through the 3D objects 508. The material properties of the voxels included in 3D objects 508 may further be defined to modify the hue (e.g., color) of the light during propagation. In some examples, the 3D objects 508 may appear opaque or nearly opaque to a viewer, but the 3D objects 508 may have enough transparency to permit a colored shadow to be cast by the 3D objects 508. Additional material properties may be assigned to the voxels such as reflectivity and scattering. For example, reflectivity properties may cause the 3D objects 508 to appear "shiny" or "matte." In some examples, voxels in the volume 510 outside the 3D objects 508 may be assigned material properties such that they are transparent.

The volume renderer may simultaneously render volume 500 and 510 with a same light source to render a 3D scene 512 that includes a 2D image 514 generated from slice 506 and the 3D objects 508. A shadow 516 cast by the 3D object 508 on the 2D image 514 is also visible in 3D scene 512. The details of the rendering of volumes 500 and 510 will now be discussed in more detail with reference to FIGS. 6-9.

Figure 6:
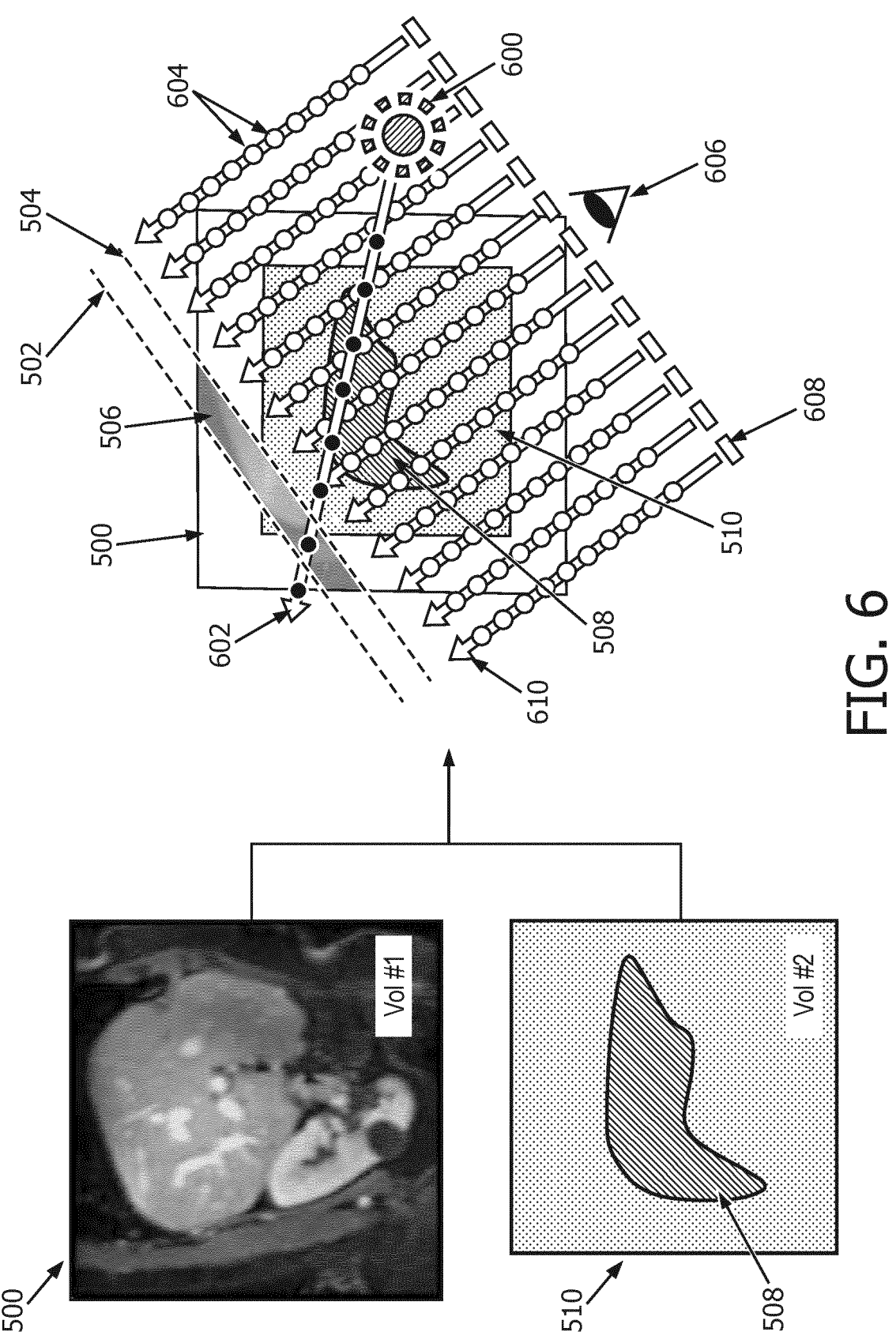
FIG. 6 provides a graphical overview of a lighting pass and a compositing pass for rendering a 3D scene in accordance with examples of the present disclosure.

FIG. 6 provides a graphical overview of a lighting pass and a compositing pass for rendering a 3D scene in accordance with examples of the present disclosure. The lighting and compositing pass may be performed by a volume renderer, such as volume renderer 334. In some examples, the lighting pass may be performed prior to the compositing pass. During the lighting pass, a virtual light source 600 is simulated in relation to the volumes 500 and 510. In some examples, such as the one shown in FIG. 6, the light source 600 may be a point light source that radiates light in all directions with equal intensity. In other examples, the light source 600 may be a directed light source (e.g., spotlight, beam). In some examples, multiple light sources may be simulated. The number of light sources, type of light source, position of the light source 600 relative to the volumes 500 and 510 and/or the intensity of the light source 600 may be pre-set or selected by a user via a user interface. In some examples, other properties of the light source may also be selected by a user such as a size of the light source 600 and/or a color (e.g., wavelength range) of the light source 600. Examples of suitable light sources and user-control thereof may be found in U.S. patent application Ser. Nos. 16/306,951 and 16/347,739, the contents of which are incorporated herein by reference for any purpose.

Continuing with the lighting pass, light from the light source 600 is propagated in three dimensional space through the volumes 500 and 510. In FIG. 6, only a single light ray 602 is shown, but it understood that many light rays are propagated through the volumes 500, 510 to simulate the light source 600. The amount of light reaching each voxel of the volumes 500 and 510 is computed according to the properties of the light source 600 and the material properties assigned to each voxel. The computed amount of light for each voxel is stored for use in the compositing pass.

During the compositing pass, rays 610 are propagated through the volumes 500 and 510 from an observation plane 608 of a virtual observer 606. In some examples, the rays 610 may be parallel to one another and orthogonal to the observation plane 608. In some examples (not shown), the rays 610 may be propagated through the volumes 500 and 510 from a single point on the observation plane 608, for example, at a location of the virtual observer 606 similar to light rays cast from a point light source. Rays 610 propagated from a single point may generate a perspective view. The distance of the observation plane 608 from the volumes 500 and 510 and/or the orientation of the observation plane 608 relative to the volumes 500 and 510 may be pre-set or selected by a user via a user interface. Based, at least in part, on the propagation of the rays 610 through the voxels of volumes 500 and 510, the volume renderer may compute a final value of the voxel and/or pixel of the 3D scene shown to the user on a display (e.g., display 338).

Figure 7:
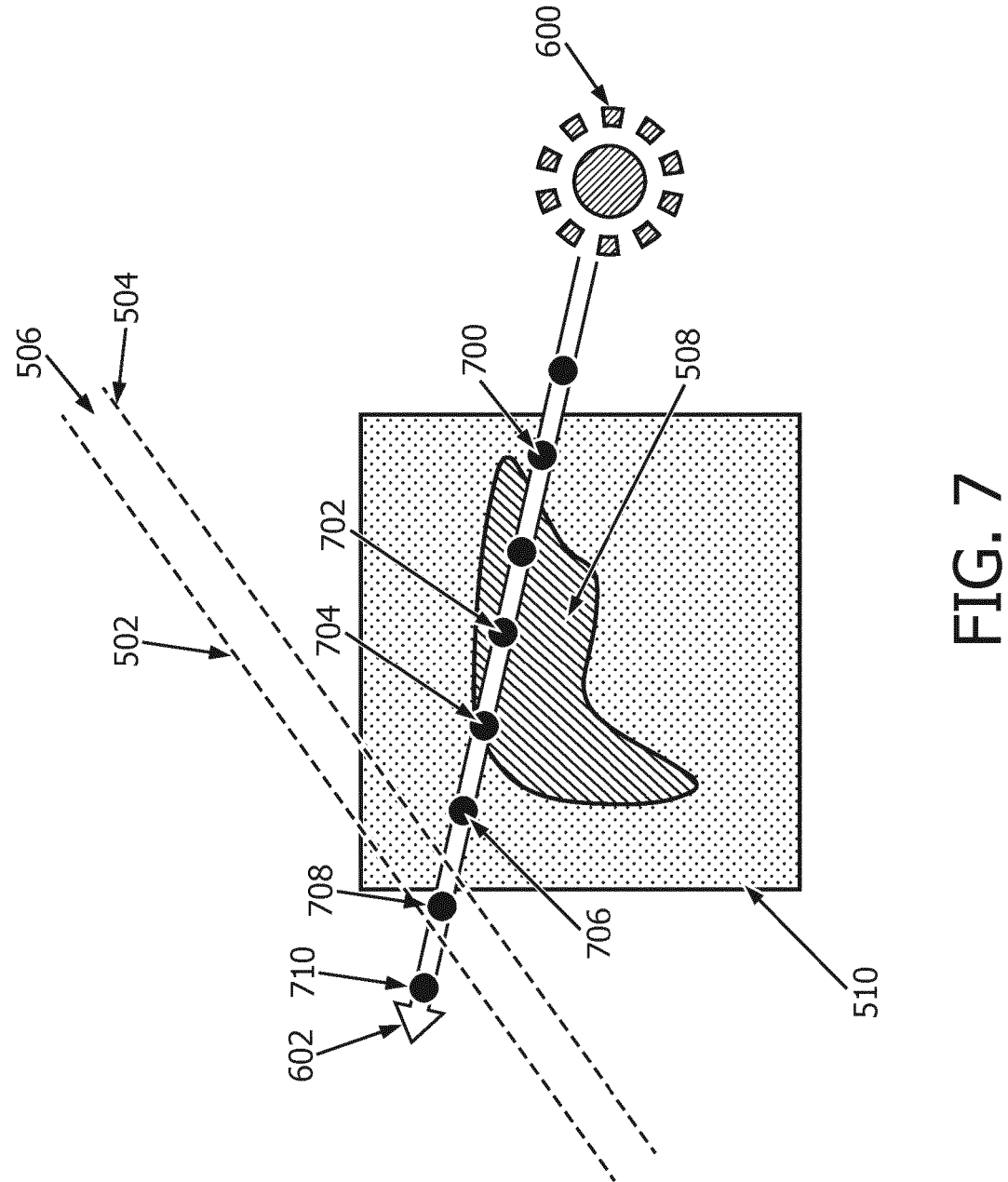
FIG. 7 provides a graphical depiction of the lighting pass in accordance with examples of the present disclosure.

FIG. 7 provides a graphical depiction of the lighting pass in accordance with examples of the present disclosure. Volume 510 including 3D object 508 and the cropping planes 502 and 504 that define slice 506 of volume 500 are shown. As discussed with reference to FIG. 6, light rays 602 may be propagated from a light source 600 through space and the amount of light reaching each location may be computed and stored according to a physical model. In some examples, the physical model may include an exponential light attenuation equation:

$$L_{RGB}(X) = \exp\left(-\sum_{i=1}^{2} A_{RGB}^{i} \int_{X}^{Light} F(V^{i}) ds\right) \qquad \text{Equation 1}$$

Where L(X) is the amount of light reaching each location X. In some examples, each location X may be a voxel in volume 500 or 510. $A^{i}$ corresponds to the absorption coefficients define for each volume i (e.g., volume 500 or 510), or a portion of the volume (e.g., slice 506 and 3D object 508) for each voxel and $F(V^{i})$ is an estimate of the material density (a material property), which is a function of volume i voxel values.

In some examples, such as the one shown in Equation 1, the absorption coefficient A may be defined separately for red, green, and blue, A=[R, G, B]. For example, slice 506 may have $A^{1}$=[1, 1, 1] and 3D object 508 may have $A^{2}$=[1, 1, 0.1]. The blue component for $A^{2}$ is set low so that blue light deeply penetrates through and propagates beyond the 3D object 508, which may generate a blue shadow on the slice 506 beyond the 3D object 508 (from the perspective of the ray 602). All components of $A^{2}$ are equal, so the slice 506 does not affect light color during propagation.

This is depicted in FIG. 7 by points along the light ray 602. At point 700, the light ray 602 is not yet incident on the 3D object 508. As the ray 602 propagates through the 3D object 508, the red and green components of the light ray 602 are attenuated at a higher rate than the blue component. Thus, the light takes on a more bluish appearance as indicated by the shading of points 702 and 704. However, even the blue components of light ray 602 are attenuated to an extent, indicated by the darker shading of point 706 compared to point 704, and the darker shading of point 704 compared to point 702. The blueish light of the ray 602 will then be incident on the slice 506, creating a blue shadow (not shown in FIG. 7). If slice 506 is not set to be completely opaque, the light ray 602 will continue to propagate through slice 506. As shown by points 708 and 710, the components of light ray 602 are attenuated the same by slice 506 due to the equal parameters of $A^{1}$, so the hue of the light ray 602 is not altered as it propagates through the slice 506.

Figure 8:
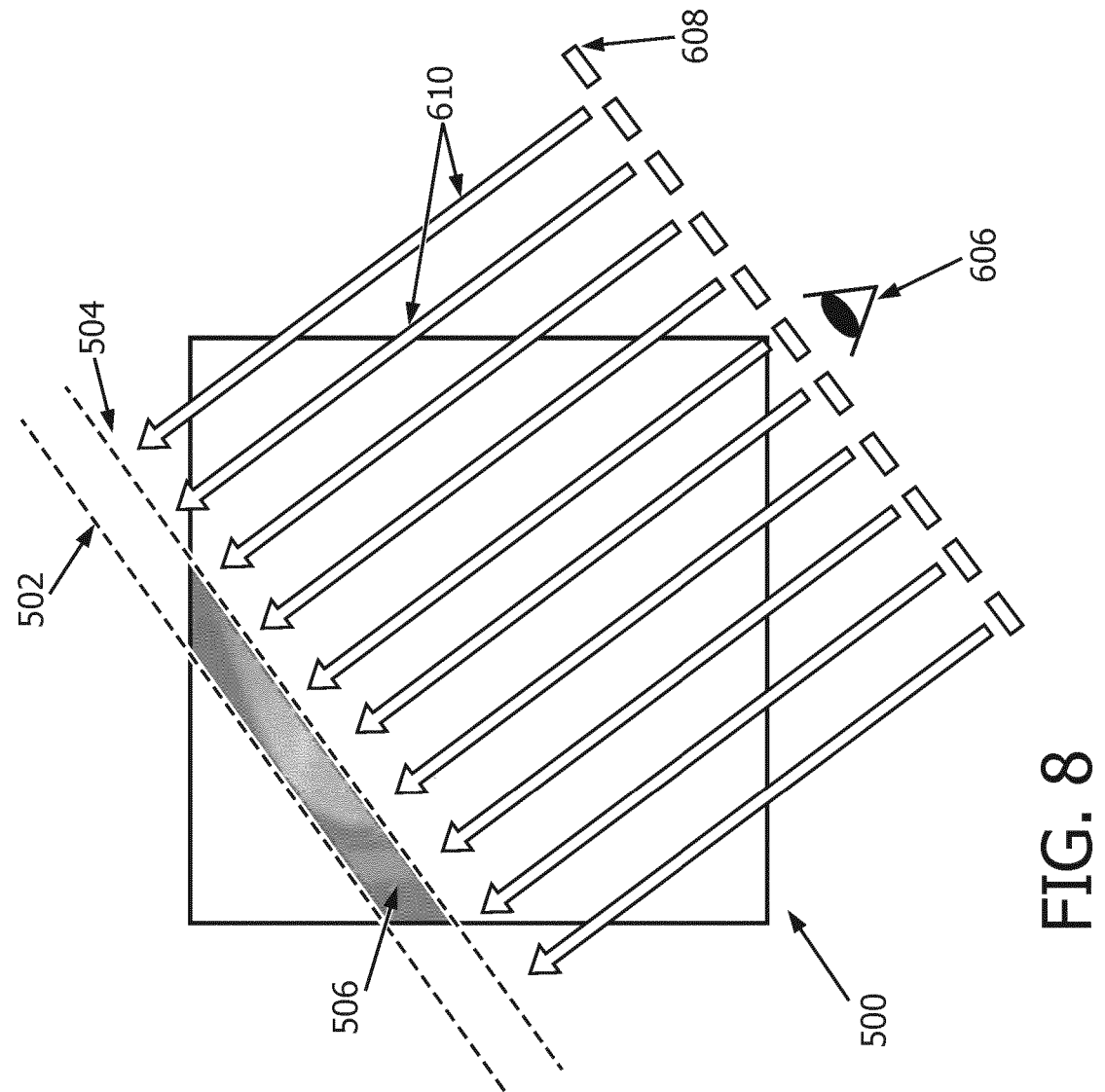
FIG. 8 provides a graphical depiction of the compositing pass in accordance with examples of the present disclosure.

FIG. 8 provides a graphical depiction of the compositing pass in accordance with examples of the present disclosure. The volume 500 including slice 506 defined by cropping planes 502, 504, the virtual observer 606, observation plane 608, and parallel rays 610 are shown. The distance between cropping planes controls thickness of the portion of the volume being displayed, while the value of the density $F(V^{1})$ controls semi-transparency or the image plane. In some examples, the volume renderer may implement a ray marching numerical scheme that uses a front-to-back RGB accumulation with tri-linear interpolated volumetric samples 604 along the direction of the rays 610. Based on the light calculated for each voxel in the lighting pass and the ray 610 marching, the volume renderer may compute a final value of the voxel and/or pixel of the 3D scene shown to the user on a display (e.g., display 338).

In some examples, in both the lighting and compositing passes, volume 500 may be ignored everywhere except for voxels in the slice 506 (e.g., the region between the cropping planes 502 and 504) as indicated by the empty "box" for volume 500 outside the cropping planes 502, 504. In some examples, the volume 510 may be ignored everywhere except for voxels in the 3D objects 508. In some examples, the ignored voxels of the volumes 500 and 510 may be removed from the datasets for the volumes. In some examples, the ignored voxels may be assigned material properties that cause those voxels not to be rendered and/or affect light propagation (e.g., transparent).

Figure 9:
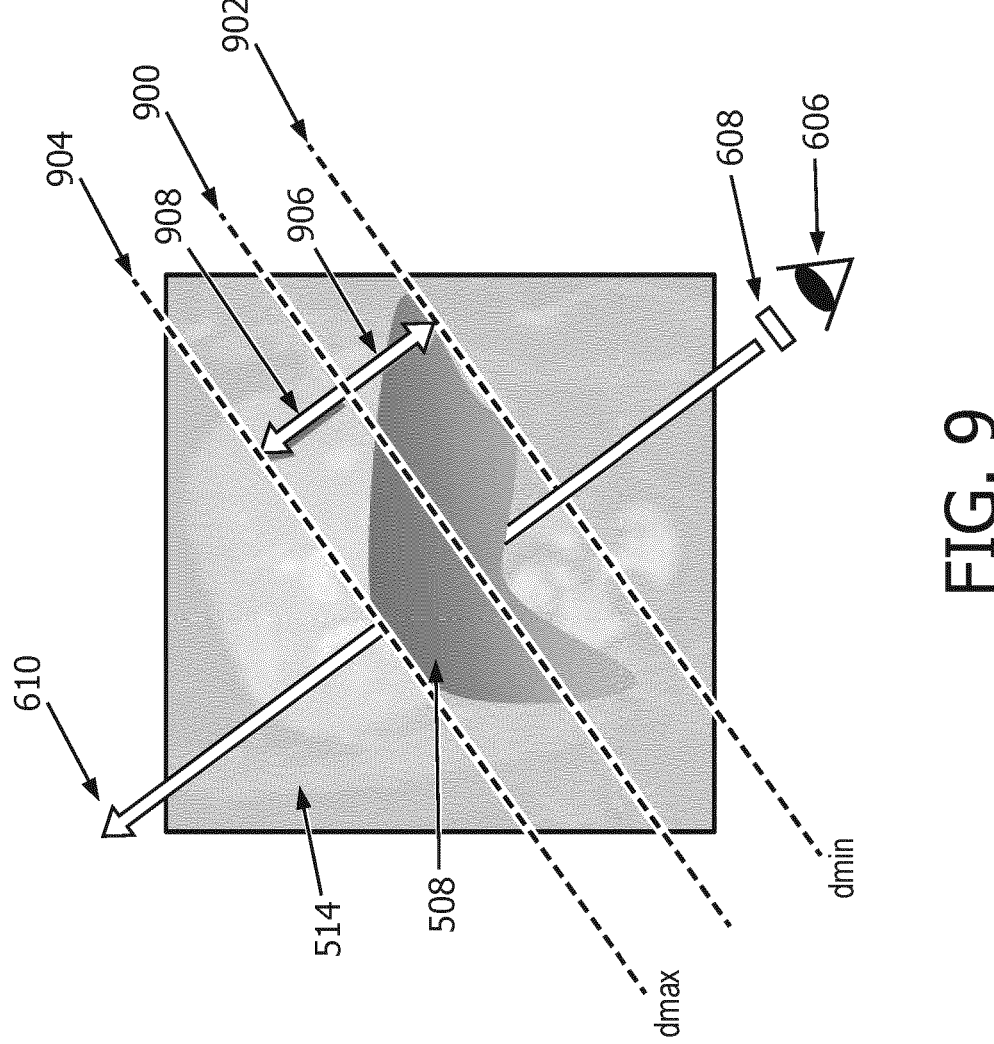
FIG. 9 provides a graphical depiction of enhanced visualization of a 3D scene in accordance with examples of the present disclosure.

FIG. 9 provides a graphical depiction of enhanced visualization of a 3D scene in accordance with examples of the present disclosure. Optionally, to further enhance visualization of the relative position of the 3D object 508 and the slice 506, artificial distance-based colorization may be applied to the 3D object. In some examples, during the compositing pass, the RGB value of each voxel of the 3D object 508 may be multiplied by a colormap value indexed by the distance between a position of the voxel of the 3D object 508 and a position of the slice 506. For example, the colormap value may cause voxels of the 3D object 508 that are closer to the slice 506 to take on a more blue appearance and voxels of the 3D object 508 that are farther from the slice 506 to take on a more orange appearance. Blue and orange are provided only as examples, and other colors may be used. Furthermore, more than two colors may be used to generate the colormap values in some examples.

In other examples, color mapping may be applied after the compositing pass, and the color mapping may be applied to the final pixel value of the 3D scene. As shown in FIG. 9, the color mapping may be based, at least in part, on a distance estimate along the ray 610 (e.g., "first hit"). In this approach, the distance is based on a distance from the viewing plane 608 of the virtual observer 606 to a point in the 3D object 508. This is in contrast to the previous method where the coloring was based on a distance between the 3D object 508 and the slice 506. In the example shown in FIG. 9, a closest point of the 3D object 508 on plane 902 may be the minimum distance (dmin) from the plane 608 and the farthest point of the 3D object 508 on plane 904 may be the maximum distance (dmax) from the plane 608. A midpoint of the 3D object 508 is indicated by plane 900. In some examples, the color map values may cause pixels generated from voxels in the 3D object 508 farther from the viewing plane 608 to appear more blue as indicated by arrow 908. The colormap values may cause pixels generated from voxels in the 3D object 508 closer to the viewing plane 608 to appear more orange as indicated by arrow 906. Blue and orange are provided only as examples, and other colors could be used. Furthermore, more than two colors may be used to generate the colormap values in some examples.

In still further examples, the attenuation $A^i$ values of each voxel of the 3D object 508 may be multiplied by a colormap value indexed by the distance between a position of the voxel of the 3D object 508 and a position of the slice 506 prior to the compositing and lighting passes. In these examples, the shadows cast by the 3D object 508 may change color depending on the distance of the portion of the 3D object 508 responsible for casting the shadow is from the slice 506. The varying color of the shadow may be in addition to the varying color of the 3D object 508 itself in some examples.

Figure 10:
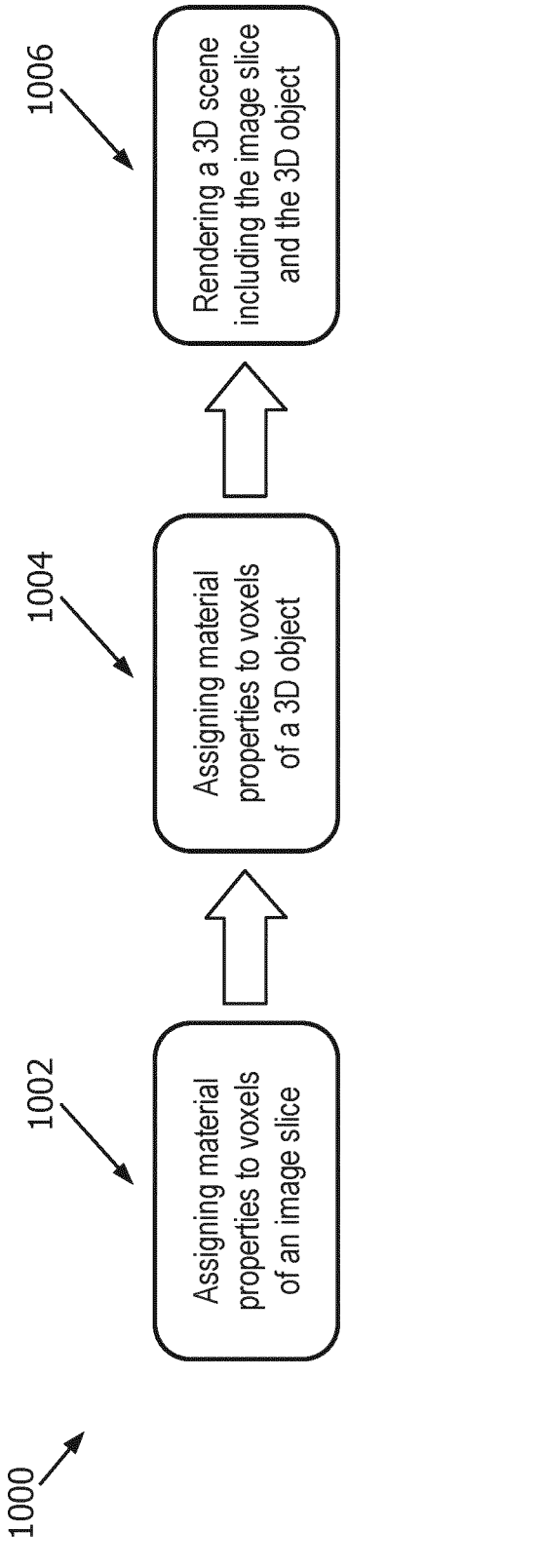
FIG. 10 is a flow chart of a method in accordance with examples of the present disclosure.

FIG. 10 is a flow chart of a method in accordance with examples of the present disclosure. 7. In some examples, the method 1000 may be performed, at least in part, by a volume renderer, such as volume renderer 334. In some examples, portions of the method 1000 may be performed by a multiplanar reformatter, such as multiplanar reformatter 332.

At block 1002, "assigning material properties to voxels of an image slice" may be performed. The image slice may have been obtained from a first volume in some examples. In some examples, the first volume may have been acquired by an ultrasound imaging system, a magnetic resonance imaging system, and/or a computed tomography imaging system. At block 1004, "assigning material properties to voxels of a 3D object" may be performed. In some examples, the 3D object may have been obtained from a second volume. In some examples, the first volume and the second volume may be from a same image acquisition (e.g., same dataset). In some examples, material properties of the voxels of the 3D object and/or the image slice are wavelength-dependent. In some examples, the first and second volumes may have been acquired from different image acquisitions, imaging modalities, and/or datasets. In some examples, the 3D object may be segmented from the second volume. In some examples, the segmented 3D object may be overlaid with or replaced by a model of the 3D object.

At block 1006, "rendering a 3D scene including the image slice and the 3D object" may be performed. In some examples, the rendering may be performed with at least one virtual light source. In some examples, rendering includes propagating rays from the virtual light source through the first volume and the second volume. In some examples, rendering includes casting rays orthogonal to an observation plane of a virtual observer. In some examples, a user input indicating a location and orientation of the observation plane relative to the first volume and the second volume is received. Optionally, material properties may be assigned to the voxels of the 3D object such that voxels of the 3D object closer to the observation plane are rendered in a different color than voxels of the 3D object farther from the observation plane. In some examples, the image slice is rendered in gray-scale and the 3D object is rendered in color. In some examples, voxels of the first volume outside the image slice and voxels of the second volume outside the 3D object are ignored during rendering.

In some examples, the material properties assigned to the voxels of the 3D object are configured to render the 3D object semi-transparent and alter a color of light from the virtual light source as the light propagates through the 3D object. In some examples, the material properties of the image slice are configured to render the image slice semi-transparent.

FIGS. 11-16 show example 3D scenes rendered from different 3D datasets in accordance with examples of the present disclosure.

Figure 11B:
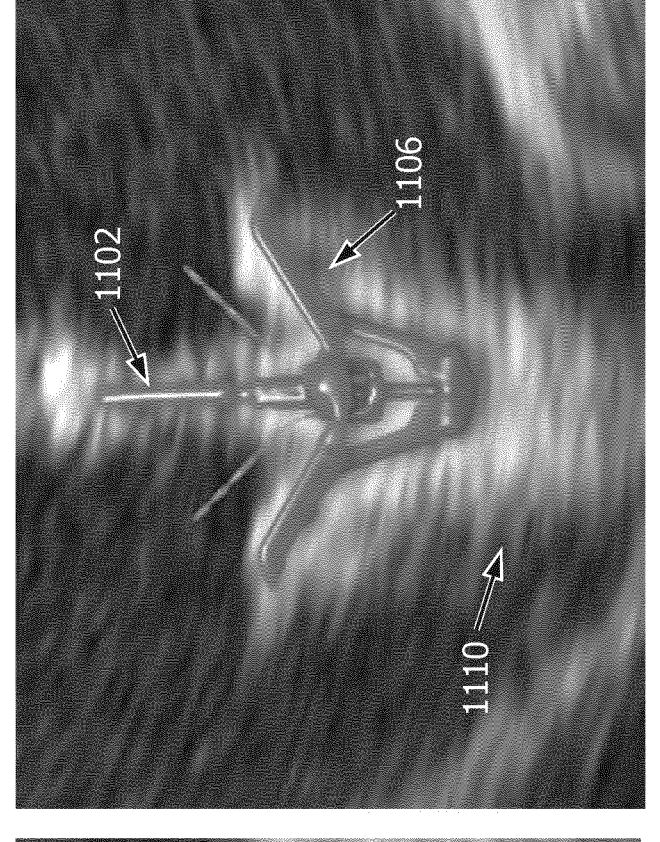
FIG. 11A and FIG. 11B show 3D scenes of a 3D model of a mitral valve clip in a 2D plane of a cardiac view acquired by ultrasound imaging in accordance with examples of the present disclosure.
Figure 11A:
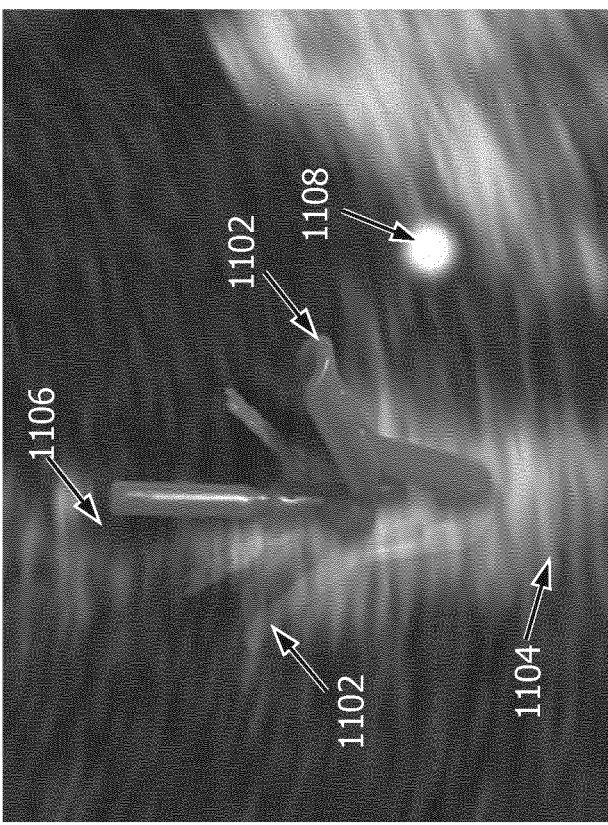

FIGS. 11A and 11B show 3D scenes of a 3D model of a mitral valve clip in a 2D plane of a cardiac view acquired by ultrasound imaging in accordance with examples of the present disclosure. FIG. 11A shows an out-of-plane view 1100A of the mitral valve clip 1102 in relation to a 2D ultrasound slice 1104. The material properties of the mitral valve clip 1102 are set such that the mitral valve clip 1102 is opaque while the slice 1104 is semi-transparent (e.g., at least some light propagates through the slice 1104), allowing the other half of the mitral valve clip 1102 to be seen through the slice 1104. However, the slice 1104 is opaque enough such that a blue shadow 1106 cast by the mitral valve clip 1102 is visible. In view 1100A, the position of the light source is shown as an orb 1108.

FIG. 11A shows an in-plane view 11B of the mitral valve clip 1102 in relation to a 2D ultrasound slice 1110. While the transparency of the slice 1110 is less noticeable, the shadow 1106 cast by the mitral valve clip 1102 is still visible. In some examples, both slice 1104 and 1110 may be extracted from a volume data set by a multiplanar reformatter, such as multiplanar reformatter 332.

FIGS. 12A and 12B show 3D scenes of a mitral valve clip in a 2D plane of a cardiac view acquired by ultrasound imaging in accordance with examples of the present disclosure. FIGS. 12A and 12B were rendered from the same dataset as FIGS. 11A and 11B. However, instead of a 3D model of the mitral valve clip, the "raw" mitral valve clip 1202 segmented from the acquired image volume is rendered as a 3D object. Furthermore, different material properties have been applied. For example, the mitral valve clip 1202 is rendered having tissue-like visual characteristics and a reddish shadow 1206 is cast on the ultrasound slice 1204. In another example, as can be seen in the out-of-plane view 1200A, the slice 1204 is opaque, so only a portion of the mitral valve clip 1202 is visible. Furthermore, the simulated light source is in a different location than in view 1100A. In the in-plane view 1200B, the light source is placed nearly "head on" so little shadowing 1206 on slice 1210 is visible.

Figure 13:
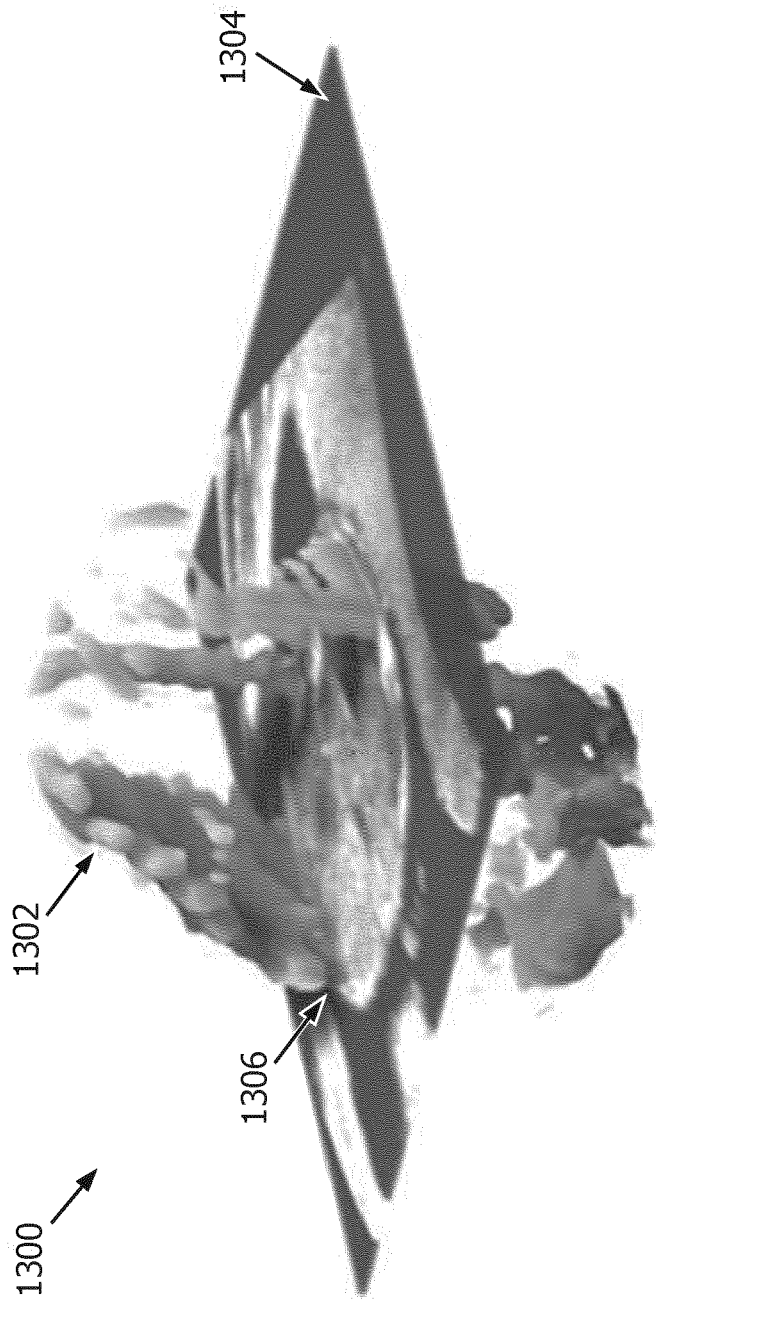
FIG. 13 shows a 3D scene of cardiac tissue and a 2D plane of a cardiac view acquired by ultrasound imaging in accordance with examples of the present disclosure.

FIG. 13 shows a 3D scene of cardiac tissue and a 2D plane of a cardiac view acquired by ultrasound imaging in accordance with examples of the present disclosure. The 3D object and the 2D slice need not be in any particular spatial relation to one another, nor is the observation plane required to be parallel to the slice. In 3D scene 1300, portions of cardiac tissue 1302 have been segmented from a scanned ultrasound volume and rendered with an oblique slice 1304, which is tilted with respected to the virtual observer. Similar to FIGS. 12A and 12B, the voxels corresponding to cardiac tissue 1302 have been rendered with material properties that give the voxels a tissue-like appearance that casts reddish shadows 1306 on slice 1304. Slice 1304 has been rendered with material properties such that slice 1304 is opaque, similar to slices 1204 and 1210.

Figure 14:
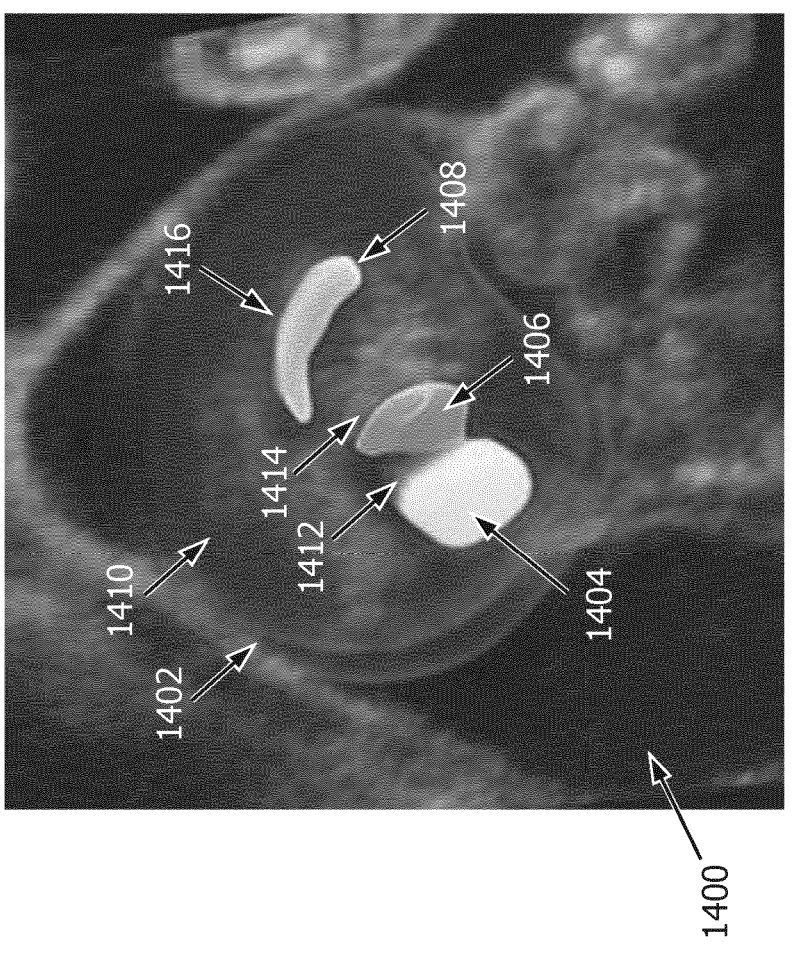
FIG. 14 shows a 3D scene of models of 3D objects and a 2D plane of a fetal skull acquired by ultrasound imaging in accordance with examples of the present disclosure.

FIG. 14 shows a 3D scene of models of 3D objects and a 2D plane of a fetal skull acquired by ultrasound imaging in accordance with examples of the present disclosure. In some examples, the 3D objects may be models that are included in a volume separate from the volume from which the 2D slice was obtained. As shown in FIG. 14, multiple models of 3D objects 1402, 1404, 1406, and 1408 may be rendered in relation to a 2D slice 1400 of the fetal skull. Each 3D object 1402, 1404, 1406, and 1408 may be rendered with different material properties, such as color and transparency. For example, object 1402 is rendered as semi-transparent while 3D objects 1404, 1406, and 1408 are more opaque. Furthermore, the 3D objects 1402, 1404, 1406, and 1408 cast different colored shadows 1410, 1412, 1414, and 1416, respectively.

While the principles of the present disclosure have been described with reference to an ultrasound imaging system, examples of the present disclosure may be extended to other imaging modalities.

Figures 15A, 15B:
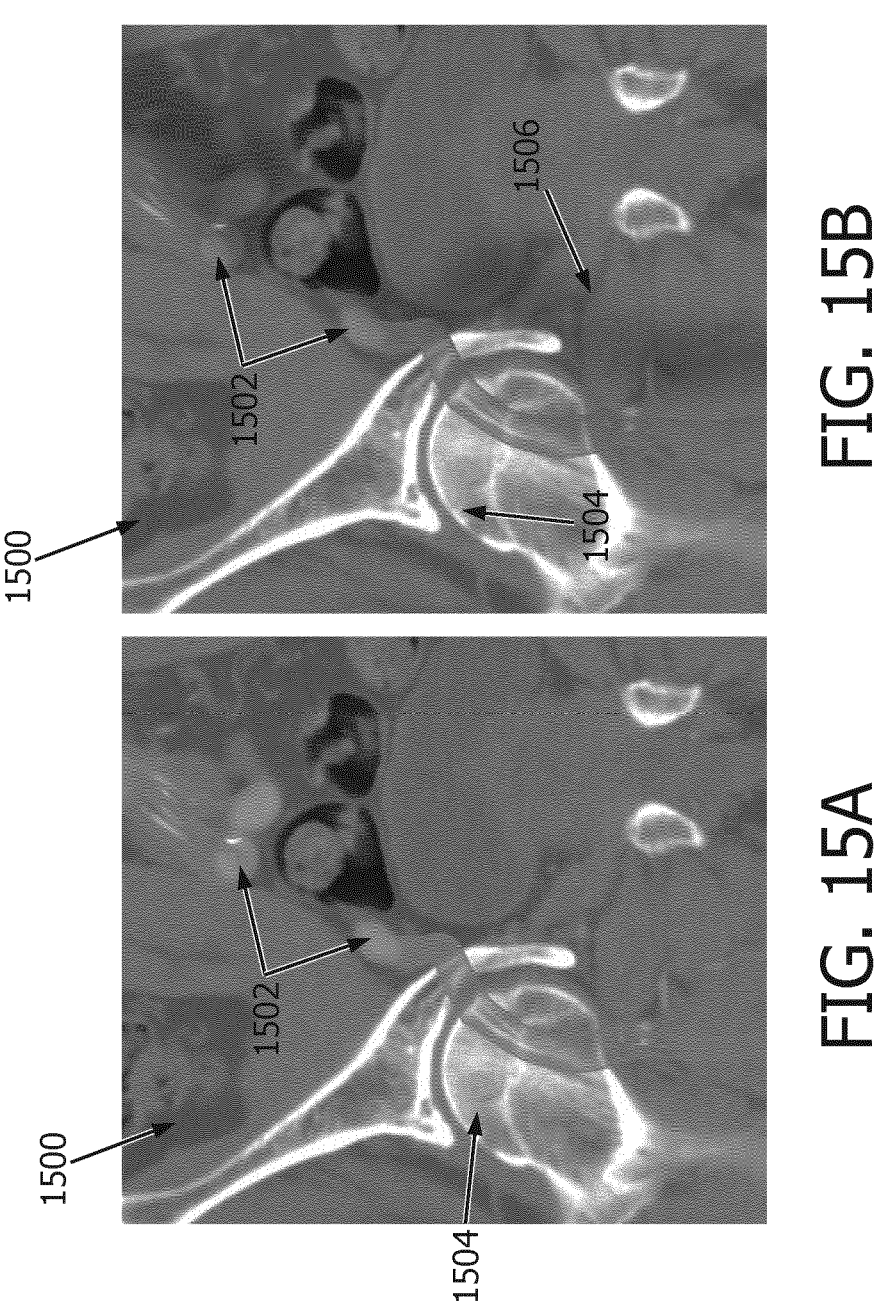
FIG. 15A and FIG. 15B show 3D scenes of a blood vessel and a 2D plane of a joint acquired by computed tomography in accordance with examples of the present disclosure.

FIGS. 15A-15B show 3D scenes of a blood vessel and a 2D plane of a joint acquired by computed tomography in accordance with examples of the present disclosure. FIG. 15A shows a blood vessel 1502 rendered as a 3D object in relation to an image plane 1500 including a joint 1504. The blood vessel 1502 has been rendered so as to be semi-transparent. However, in FIG. 15A, no shadow is rendered. In contrast in FIG. 15B, the blood vessel 1502 has been rendered according to examples of the present disclosure and casts a blue shadow 1506 on the image plane 1500, which may increase the ability of a viewer to discern the blood vessel's 1502 position in relation to the joint 1504.

Figure 16B:
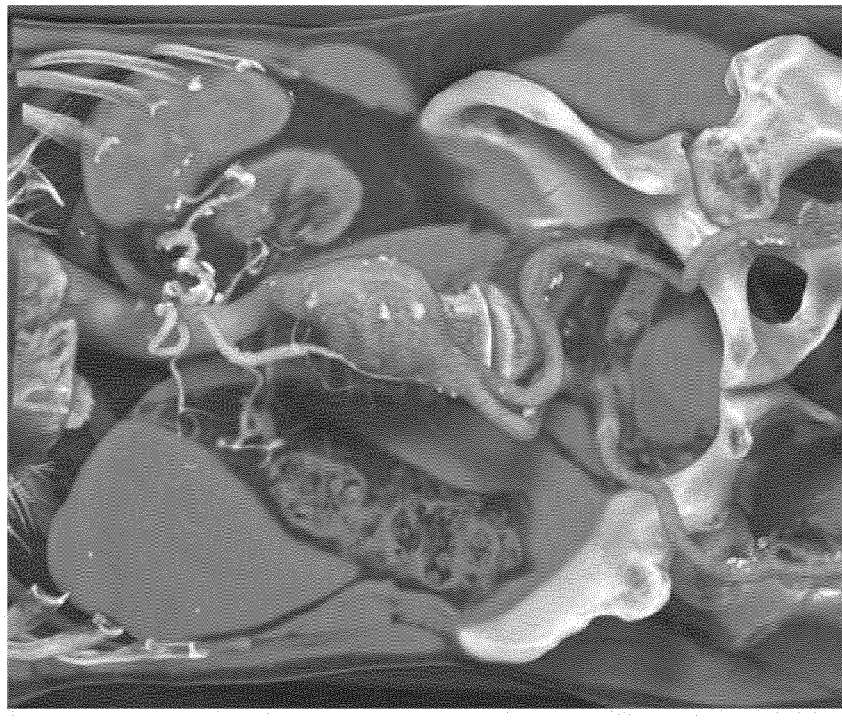
FIG. 16A and FIG. 16B show 3D scenes of 2D plane and various internal organs acquired by computed tomography in accordance with examples of the present disclosure.
Figure 16B:
Figure 16A:
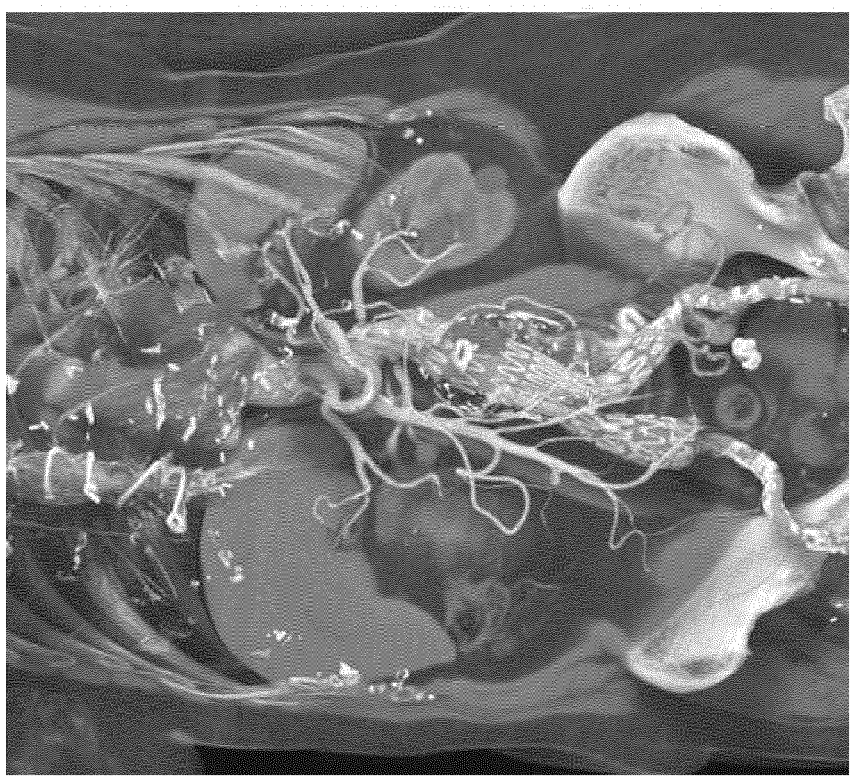

FIGS. 16A-16B show 3D scenes of 2D plane and various internal organs acquired by computed tomography in accordance with examples of the present disclosure. As illustrated by FIGS. 16A and 16B, various anatomical features can be segmented from a 3D dataset by known methods and selectively rendered in relation to a desired 2D plane from the 3D dataset. In some examples, a user may select which 2D slice and which anatomical features (e.g., organs) to render in relation to the 2D slice.

As described herein, 2D images generated from slices (e.g., imaging planes) may be rendered simultaneously in a 3D scene with one or more 3D objects using volumetric lighting and assigning translucent materials to the one or more 3D objects so that they cast colored shadows on the 2D image. Optionally, the 3D objects may be colorized based, at least in part, on how far the 3D objects are from the 2D image and/or an observation plane. Rendering the 2D images and 3D objects according to examples of the present disclosure may improve a viewer's ability to discern the spatial relationship between the 2D image and the 3D objects in some applications.

In various examples where apparatuses, components, systems and/or methods are implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like. Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform functions of the systems and/or methods described herein. For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods described above.

In view of this disclosure it is noted that the various methods and devices described herein can be implemented in hardware, software, and/or firmware. Further, the various methods and parameters are included by way of example only and not in any limiting sense. In view of this disclosure, those of ordinary skill in the art can implement the present teachings in determining their own techniques and needed equipment to affect these techniques, while remaining within the scope of the invention. The functionality of one or more of the processors described herein may be incorporated into a fewer number or a single processing unit (e.g., a CPU) and may be implemented using application specific integrated circuits (ASICs) or general purpose processing circuits which are programmed responsive to executable instructions to perform the functions described herein.

Although the present system may have been described with particular reference to an ultrasound imaging system, it is also envisioned that the present system can be extended to other medical imaging systems where one or more images are obtained in a systematic manner. Accordingly, the present system may be used to obtain and/or record image information related to, but not limited to renal, testicular, breast, ovarian, uterine, thyroid, hepatic, lung, musculoskeletal, splenic, cardiac, arterial and vascular systems, as well as other imaging applications related to ultrasound-guided interventions. Further, the present system may also include one or more programs which may be used with conventional imaging systems so that they may provide features and advantages of the present system. Certain additional advantages and features of this disclosure may be apparent to those skilled in the art upon studying the disclosure, or may be experienced by persons employing the novel system and method of the present disclosure. Another advantage of the present systems and method may be that conventional medical image systems can be easily upgraded to incorporate the features and advantages of the present systems, devices, and methods.

Of course, it is to be appreciated that any one of the examples, examples or processes described herein may be combined with one or more other examples, examples and/or processes or be separated and/or performed amongst separate devices or device portions in accordance with the present systems, devices and methods.

Finally, the above-discussion is intended to be merely illustrative of the present apparatuses, systems and methods and should not be construed as limiting the appended claims to any particular example or group of examples. Thus, while the present apparatuses, systems, and methods have been described in particular detail with reference to exemplary examples, it should also be appreciated that numerous modifications and alternative examples may be devised by those having ordinary skill in the art without departing from the broader and intended spirit and scope of the present systems and methods as set forth in the claims that follow. Accordingly, the specification and drawings are to be regarded in an illustrative manner and are not intended to limit the scope of the appended claims.

What is claimed is:

1. An apparatus comprising:
a processor configured to:
   assign material properties to voxels of an image slice obtained from a first volume;
   assign material properties to voxels of a three dimensional (3D) object obtained from a second volume; and
   render a 3D scene including the image slice and the 3D object, wherein the material properties assigned to the voxels of the 3D object are configured to cause the 3D object to be rendered semi-transparent in the 3D scene, and to alter a color of light from at least one virtual light source as the light from the at least one virtual light source propagates through the 3D object to project a shadow of the altered color on the image slice when rendering the 3D scene; and
a display configured to display the 3D scene.

2. The apparatus of claim 1, wherein the processor is in communication with a user interface configured to receive a user input that defines a location and a thickness of the image slice obtained from the first volume.

3. The apparatus of claim 1, wherein a location of the virtual light source in relation to the first volume and the second volume is adjustable.

4. The apparatus of claim 1, wherein the first volume and the second volume are from a same image acquisition.

5. The apparatus of claim 1, wherein the processor is configured to provide a gradient shading by assigning a first color to one or more of the voxels of the 3D object closer to the image slice and a second color different from the first color to one or more of the voxels of the 3D object farther from the image slice.

6. The apparatus of claim 1, wherein the 3D object includes at least one of a model, an invasive device, or an anatomical feature.

7. A method comprising:
assigning material properties to voxels of an image slice obtained from a first volume;
assigning material properties to voxels of a three dimensional (3D) object obtained from a second volume; and
rendering a 3D scene including the image slice and the 3D object, wherein the material properties assigned to the voxels of the 3D object are configured to cause the 3D object to alter a color of light from at least one virtual light source as the light propagates through the 3D object so as to project a shadow of the altered color on the image slice.

8. The method of claim 7, further comprising segmenting the 3D object from the second volume.

9. The method of claim 8, further comprising overlaying or replacing the 3D object with a model of the 3D object.

10. The method of claim 7, wherein the material properties of the voxels of the image slice determine a transparency of the image slice.

11. The method of claim 7, wherein the rendering comprises casting rays orthogonal to an observation plane of a virtual observer.

12. The method of claim 11, further comprising providing a gradient shading by assigning a first material color to one or more of the voxels of the 3D object closer to the observation plane and a second color different from the first color to one or more of the voxels of the 3D object farther from the observation plane.

13. The method of claim 11, wherein a location and orientation of the observation plane relative to the first volume and the second volume is adjustable.

14. The method of claim 7, wherein the material properties of the voxels of the 3D object are wavelength-dependent.

15. The method of claim 7, wherein the image slice is rendered in gray-scale and the 3D object is rendered in color.

16. The method of claim 7, wherein rendering comprises propagating rays from the virtual light source through the first volume and the second volume.

17. The method of claim 16, wherein voxels of the first volume outside the image slice and voxels of the second volume outside the 3D object are ignored during rendering.

18. The method of claim 7, further comprising assigning material properties to voxels of a second three dimensional (3D) object obtained from the second volume or a third volume,
wherein the 3D scene further includes the second 3D object, and wherein the material properties assigned to the voxels of the second 3D object are configured to cause the second 3D object to alter the color of light from the at least one virtual light source as the light propagates through the second 3D object.

19. A non-transitory computer readable medium including instructions, that when executed, cause an imaging system to:
assign material properties to voxels of an image slice obtained from a first volume;

assign material properties to voxels of a three dimensional (3D) object obtained from a second volume; and render a 3D scene including the image slice and the 3D object, wherein the material properties assigned to the voxels of the 3D object are configured to cause the 3D object to alter a color of light from at least one virtual light source as the light propagates through the 3D object so as to project a shadow of the altered color on the image slice.

20. The non-transitory computer readable medium of claim 19 further including instructions, that when executed, cause the imaging system to:

provide a gradient shading by assigning a first color to one or more of the voxels of the 3D object closer to an observation plane of the 3D scene and a second color different from the first color to one or more of the voxels of the 3D object farther from the observation plane.

21. The non-transitory computer readable medium of claim 19 further including instructions, that when executed, cause the imaging system to:

provide a gradient shading by assigning a first color to one or more of the voxels of the 3D object closer to the image slice and a second color different from the first color to one or more of the voxels of the 3D object farther from the image slice.

\*   \*   \*   \*   \*